US010136453B2

(12) United States Patent
Yeoum et al.

(10) Patent No.: US 10,136,453 B2
(45) Date of Patent: Nov. 20, 2018

(54) METHOD AND APPARATUS SUPPORTING IP MULTIMEDIA SUBSYSTEM

(71) Applicant: Samsung Electronics Co., Ltd., Gyeonggi-do (KR)

(72) Inventors: Taesun Yeoum, Seoul (KR); Hanna Lim, Seoul (KR); Sunmin Hwang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 294 days.

(21) Appl. No.: 14/598,479

(22) Filed: Jan. 16, 2015

(65) Prior Publication Data
US 2015/0208446 A1 Jul. 23, 2015

(30) Foreign Application Priority Data

Jan. 20, 2014 (KR) ........................ 10-2014-0006803

(51) Int. Cl.
*H04W 76/10* (2018.01)
*H04W 76/02* (2009.01)
(Continued)

(52) U.S. Cl.
CPC ......... *H04W 76/02* (2013.01); *H04L 65/1016* (2013.01); *H04L 65/1046* (2013.01);
(Continued)

(58) Field of Classification Search
CPC ........................... H04W 76/02; H04L 65/1016
See application file for complete search history.

(56) References Cited

U.S. PATENT DOCUMENTS

| 7,697,489 B1* | 4/2010 | Apte | ................. H04W 36/0033 |
| | | | 370/328 |
| 2005/0141541 A1* | 6/2005 | Cuny | .................... H04W 76/02 |
| | | | 370/437 |

(Continued)

FOREIGN PATENT DOCUMENTS

| WO | WO 2005064962 | * 5/2005 | ............... H04Q 7/28 |
| WO | 2013/185846 A1 | 12/2013 | |

OTHER PUBLICATIONS

European Search Report dated Oct. 9, 2017.
(Continued)

*Primary Examiner* — Michael Thier
*Assistant Examiner* — Zhensheng Zhang
(74) *Attorney, Agent, or Firm* — Cha & Reiter, LLC.

(57) ABSTRACT

A method and apparatus for supporting multiple IMS networks includes an electronic device supporting multiple IMS networks. A modem receives communication services through an access network and multiple IMS networks including first and second IMS networks; and a communication control module includes a processor. The communication control module is configured to attach the electronic device to the access network on the basis of first identification information corresponding to the access network, register the electronic device in the first IMS network via the access network on the basis of second identification information corresponding to the first IMS network, and register the electronic device in the second IMS network via the access network on the basis of third identification information corresponding to the second IMS network.

25 Claims, 11 Drawing Sheets

(51) Int. Cl.
*H04L 29/06* (2006.01)
*H04W 60/00* (2009.01)

(52) U.S. Cl.
CPC ...... *H04L 65/1069* (2013.01); *H04L 65/1073* (2013.01); *H04L 65/40* (2013.01); *H04L 65/80* (2013.01); *H04W 60/00* (2013.01); *H04W 76/10* (2018.02)

(56) References Cited

U.S. PATENT DOCUMENTS

| | | | |
|---|---|---|---|
| 2008/0091824 A1* | 4/2008 | Patel | H04L 12/66 709/225 |
| 2009/0312020 A1 | 12/2009 | Lee | |
| 2010/0111025 A1* | 5/2010 | Parlamas | H04W 76/022 370/329 |
| 2013/0039337 A1 | 2/2013 | Hwang et al. | |
| 2013/0246846 A1 | 9/2013 | Oyman | |
| 2013/0303203 A1* | 11/2013 | Wang | H04W 68/00 455/458 |
| 2014/0016618 A1 | 1/2014 | Bae et al. | |
| 2014/0133399 A1* | 5/2014 | Kim | H04W 4/14 370/328 |
| 2014/0301258 A1* | 10/2014 | Belghoul | H04W 52/0209 370/311 |
| 2015/0172333 A1 | 6/2015 | Lindstrom et al. | |

OTHER PUBLICATIONS

Chang et al.; "Conformance Test Results of Wideband CDMA User Equipment (UE) Modem"; 2002 IEEE.
3rd Generation Partnership Project; Technical Specification Group Core Network and Terminals; Characteristics of the IP Multimedia Services Identity Module (ISIM) application (Release 9); Dec. 2009.
European Search Report dated Jun. 13, 2017.

* cited by examiner

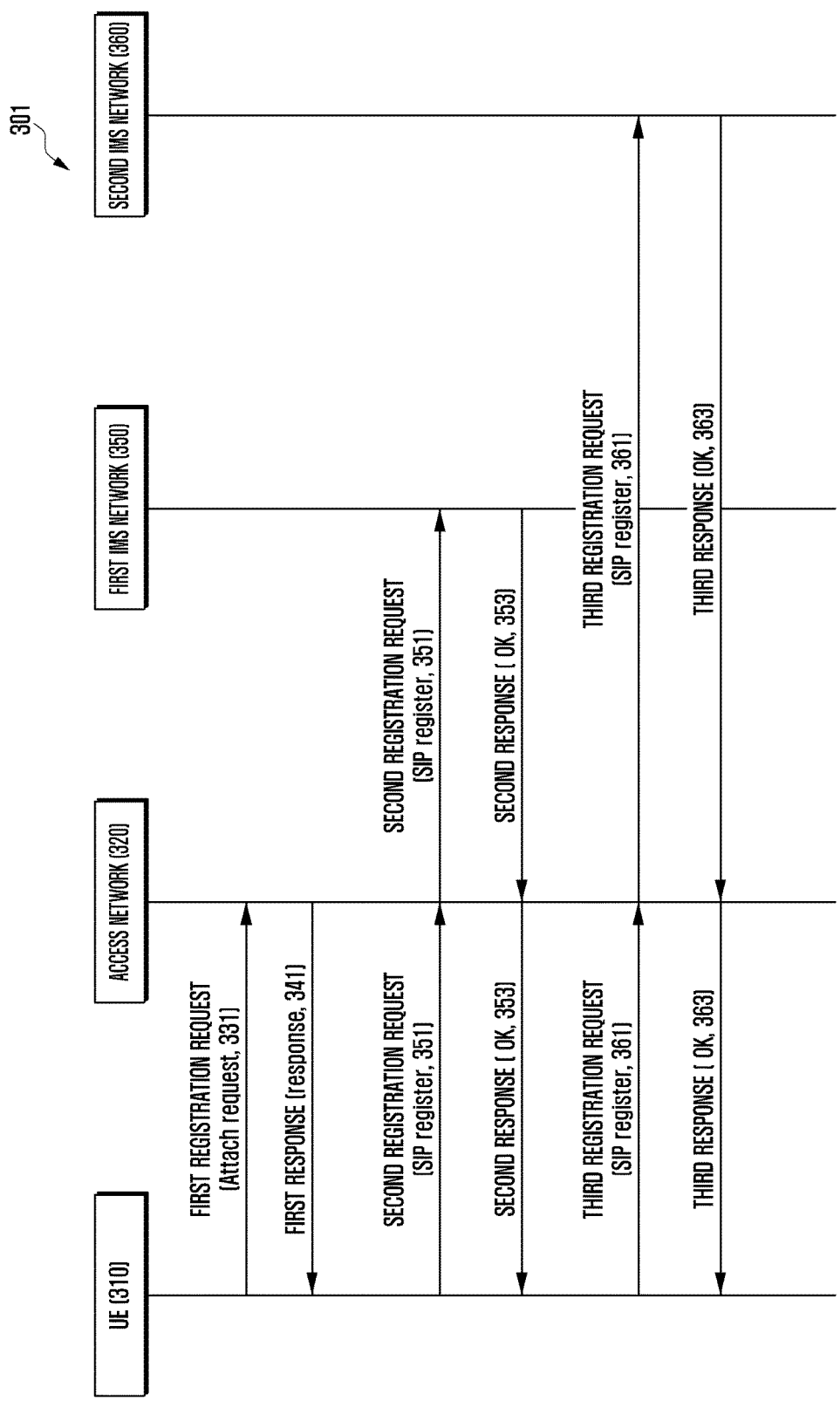

METHOD AND APPARATUS SUPPORTING IP MULTIMEDIA SUBSYSTEM

CLAIM OF PRIORITY

This application claims the benefit under 35 U.S.C. § 119(a) from a Korean patent application filed on Jan. 20, 2014 in the Korean Intellectual Property Office and assigned Serial No. 10-2014-0006803, the entire disclosure of which is hereby incorporated by reference in its entirety.

BACKGROUND

Field of the Disclosure

The present disclosure relates to a method and apparatus for wireless communication. More particularly, the present disclosure relates to a method and apparatus that provide multimedia services through wireless communication.

Description of the Related Art

Advanced wireless communication systems may provide high-speed and high-quality packet data services on the basis of wireless communication standards such as High Speed Packet Access (HSPA) or Long Term Evolution (LTE) of the 3rd Generation Partnership Project (3GPP), and High Rate Packet Data (HRPD) or Ultra Mobile Broadband (UMB) of the 3rd Generation Partnership Project 2 (3GPP2).

With advances in wireless communication systems, electronic devices supporting wireless communication (e.g. user devices including mobile phones, phablets, PDA's, tablet computers and personal computers) may include multiple communication components (e.g. modems or antennas) corresponding to multiple communication networks so as to communicate with the multiple communication networks of the same or different types. For example, an electronic device may connect to multiple wireless communication systems through the use of multiple subscriber identity modules (SIM).

With advances in communication technology, wireless communication systems may provide multimedia services (e.g. voice, video and data services) to electronic devices on the basis of the Internet Protocol (IP). For example, an electronic device may receive voice via Voice Over IP (VoIP), video or other media services through the IP multimedia subsystem (IMS) network. To provide high-quality IP-based multimedia services, a conventional wireless communication system may control multimedia service quality using various service quality indicators such as delay and throughput.

For example, the wireless communication system may provide standard mechanisms (e.g. bearers and real-time transport protocol (RTP)) to enhance the quality of IP-based calls.

In order to receive simultaneously communication services from two or more communication systems of different network operators (with different subscriber information), an electronic device may have to equip similar but different components specific to the individual communication systems (e.g. radio frequency integrated chips (RFIC) or antennas). This need to equip different components specific to the individual communication systems may cause an increase in the size or manufacturing cost of the electronic device. In addition, an increase in the number of components to be mounted in the electronic device may cause a shortage of the mounting space in the electronic device. More particularly, arranging multiple antennas in a narrow space may degrade performance of the electronic device owing to interference between the antennas.

SUMMARY

Aspects of the present disclosure address at least the above-mentioned problems and/or disadvantages and to provide at least the advantages described below. Accordingly, an aspect of the present disclosure provides a method and apparatus for wireless communication that enables simultaneous provision of services through multiple communication systems (e.g. such as multiple IP multimedia subsystem (IMS) networks) by utilizing a relatively small number of components than known heretofore.

In accordance with an aspect of the present disclosure, an electronic device supporting multiple IMS networks is provided. The electronic device may include: a modem to receive communication services through an access network and multiple IMS networks including a first IMS network, and a second IMS network. and a communication control module including a processor, wherein the communication control module is configured to: attach (i.e. connect) the electronic device to the access network on the basis of a first identification information corresponding to the access network by use of the modem, register the electronic device in the first IMS network via the access network on the basis of a second identification information corresponding to the first IMS network, and register the electronic device in the second IMS network via the access network on the basis of a third identification information corresponding to the second IMS network.

In accordance with another aspect of the present disclosure, a method for supporting multiple IMS networks is provided. The method may include: connecting, on the basis of a first identification information corresponding to an access network, an electronic device to the access network by use of a modem functionally connected with the electronic device; and registering the electronic device in a first IMS network via the access network on the basis of a second identification information corresponding to the first IMS network, and registering the electronic device in a second IMS network via the access network on the basis of a third identification information corresponding to the second IMS network.

In a feature of the present disclosure, the wireless communication method and apparatus may support multiple communication systems by utilizing a relatively small number of components, enabling an electronic device to achieve high performance with lower cost than known heretofore. The wireless communication method and apparatus contributes to the increased allocation amount of an antenna mounting space, thereby enabling an antenna size adjustment, making it possible to enhance performance of an electronic device and reduce the size thereof. The wireless communication method and apparatus according to the present disclosure may provide services of multiple IMS networks through one communication network, enabling an electronic device to reduce power consumption. In addition, the wireless communication method and apparatus may provide, through a network associated with a first subscriber information, a service of an IMS network associated with a second subscriber information. Hence, it is possible to conserve radio resources of the communication system and to simplify implementation of the communication system.

BRIEF DESCRIPTION OF THE DRAWINGS

The above and other aspects, features, and advantages of certain embodiments of the present disclosure will become more apparent to a person of ordinary skill in the art from the following detailed description taken in conjunction with the accompanying drawings, in which:

FIG. 3A, FIG. 3B and FIG. 3C illustrate operations for registration in the LTE access network and IMS network according to various embodiments of the present disclosure;

DETAILED DESCRIPTION

Figure 1:
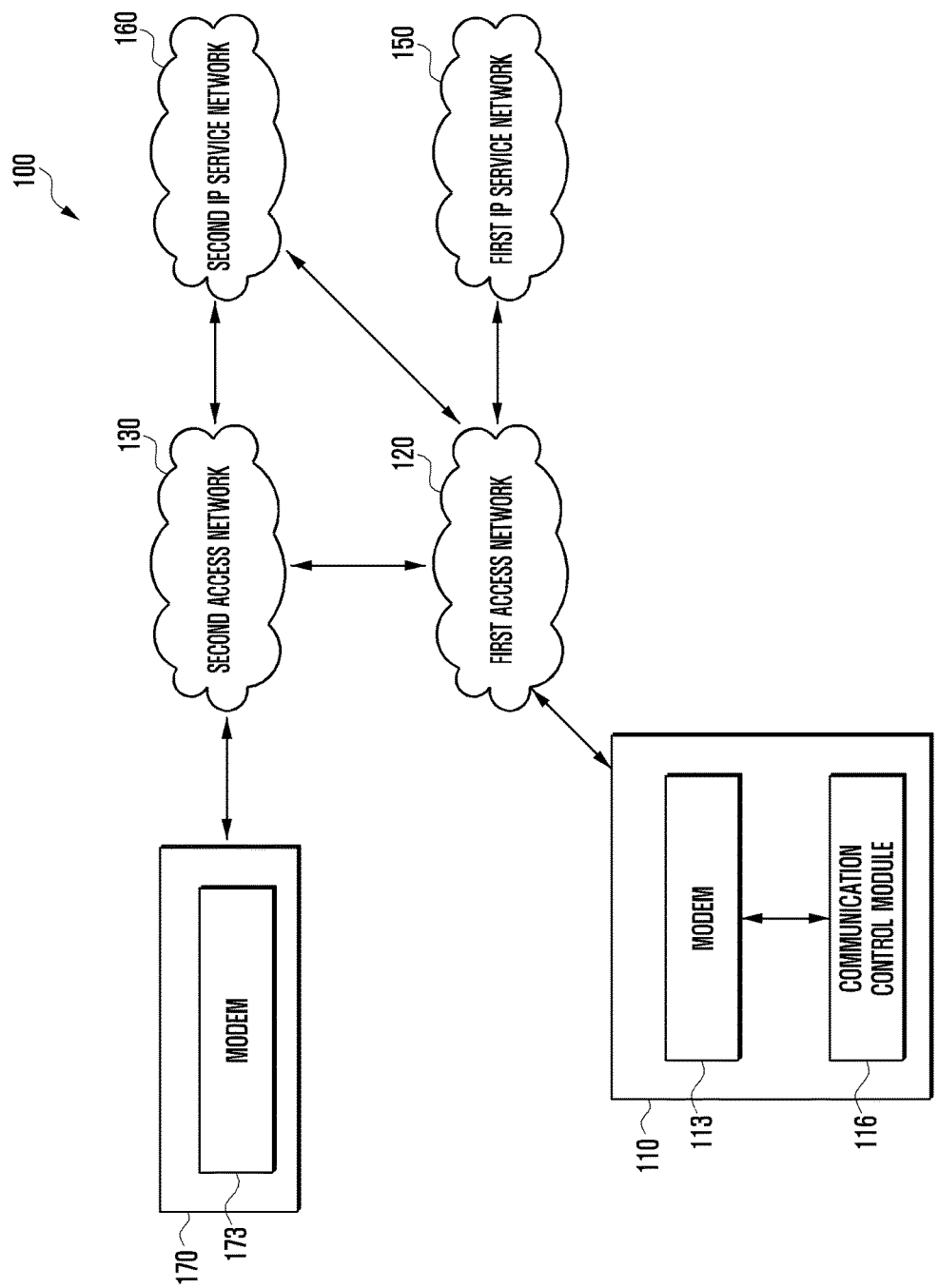
FIG. 1 illustrates one particular embodiment of a communication system according to an embodiment of the present disclosure.

Hereinafter, the present disclosure will be described in detail with reference to the accompanying drawings. The following description includes various specific details to assist a person of ordinary skill in the art in understanding the disclosure, but these specific details are to be regarded as merely exemplary. Accordingly, those persons skilled in the art will recognize that various changes and modifications of the embodiments described herein can be made without departing from the scope and spirit of the present disclosure as defined by the claims and their equivalents. The same reference symbols are used throughout the drawings to refer to the same or like parts.

It will be understood that the expressions "comprises" and "may comprise" is used to specify presence of a disclosed function, operation, component, etc. but do not preclude the presence of one or more functions, operations, components, etc. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof. In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, an artisan should understand and appreciate that the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teaching of the inventive concept.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

Unless otherwise defined herein, all terms including technical or scientific terms used herein have the same meanings as commonly understood by a person of ordinary skill in the art to which the present disclosure belongs. It will be further understood that terms, such as those defined in commonly used dictionaries, should be interpreted as having a meaning that is consistent with their meaning in the context of the specification as would be understood by a person of ordinary skill in the art, and relevant art and should not be interpreted in an idealized or overly formal sense unless expressly so defined herein.

According to various embodiments of the present disclosure, the electronic device may include devices having an operation support function. Examples of the electronic device may include smartphone, table Personal Computer (PC), mobile phone, video phone, electronic book (e-book) reader, desktop PC, laptop PC, netbook computer, Personal Digital Assistant (PDA), tablet device, phablet device, Portable Multimedia Player (PMP), MP3 player, mobile medical appliance, camera, wearable device (e.g. head-mounted device (HMD) such as electronic glasses, electronic clothing, electronic bracelet, electronic necklace, electronic "appcessory", electronic tattoo, smartwatch, etc., just to name some non-limiting possibilities, According to an embodiment, the electronic device may be one of smart home appliances having operation support function. Examples of the smart electronic appliance as an electronic device may include television, Digital Video Disk (DVD) player, audio player, refrigerator, air-conditioner, vacuum cleaner, electronic oven, microwave oven, laundry machine, air cleaner, set-to box, TV box (e.g. Samsung HomeSync™, Apple TV™, and Google TV™), game console, electronic dictionary, electronic key, camcorder, and electronic frame, etc.

According to an embodiment, examples of the electronic device may include medical device (e.g. Magnetic Resonance Angiography (MRA), Magnetic Resonance Imaging (MRI), Computed Tomography (CT)), Navigation device, Global Positioning System (GPS) receiver, Event Data Recorder (EDR), Flight Data Recorder (FDR), car infotainment device, maritime electronic device (e.g. maritime navigation device and gyro compass), aviation electronic device (avionics), security device, vehicle head unit, industrial or home robot, Automatic Teller's Machine (ATM) of financial institution, Point Of Sales (POS), etc.

According to an embodiment, examples of the electronic device may include furniture and building/structure having a communication function, electronic board, electronic signature receiving device, projector, and metering device (e.g. water, electric, gas, and electric wave metering devices). According to various embodiments, the electronic device may be any combination of the aforementioned devices. According to various embodiments of the present disclosure, the electronic device may be a flexible device. It is obvious to those skilled in the art that the electronic device is not limited to the aforementioned devices.

Descriptions are made of the electronic devices according to various embodiments with reference to accompanying drawings hereinafter. The term 'user' used in various embodiments may denote a person or a device (e.g. artificial intelligent electronic device) using the electronic device.

FIG. 1 illustrates a communication system 100 according to an embodiment. Referring now to FIG. 1, the communication system 100 may include an electronic device 110, a first access network 120, a second access network 130, a first IP service network 150, a second IP service network 160, and a second electronic device 170. The communication system 100 enables communication services (e.g. voice call service) between the electronic device 110 and the second electronic device 170. The communication system 100 may include multiple access networks deployed by different communication entities.

The electronic device 110 may include a modem 113 and a communication control module 116. The modem 113 may modulate and demodulate signals to communicate with at least one access network (e.g. LTE access network as a non-limiting example). For example, the electronic device 110 may use the modem 113 to communicate with the second electronic device 170 through a wired or wireless connection via at least one telecommunications network (e.g. access network). The communication control module 116 is functionally connected with the modem 113 and may control communication performed through the modem 113 with at least one access or IP service network. The modem 113 or communication control module 116 includes hardware components including at least one processor that may be configured by machine executable code controlling the hardware components. One or more packages may be used to realize at least a portion of the function of the modem 113 and communication control module 116. The electronic device 110 may use the modem 113 and the communication control module 116 to receive communication services through the first access network 120 and the second access network 130 or through the first IP service network 150 and the second IP service network 160.

The first access network 120 and the second access network 130 may be a communication network operated by one or more various entities or designees, including but in no way limited to a communication company.

For example, the first access network 120 and the second access network 130 may be a Long Term Evolution (LTE) network, Worldwide Interoperability for Microwave Access (WiMAX) network, Code Division Multiple Access (CDMA) 1× network, Wideband CDMA (WCDMA) network, Global System for Mobile Communications (GSM) network. The first access network 120 and the second access network 130 may provide communication services to the electronic device 110 or the second electronic device 170 through wired or wireless interfaces. In one embodiment, the first access network 120 and the second access network 130 may be different types of access networks that employ different protocols but are operated by the same entity. For example, the first access network 120 may be an LTE network (or LTE core network) operated by one entity, and the second access network 130 may be a mobile WiMAX network operated by the same entity. In another embodiment, the first access network 120 and the second access network 130 may be the same type of access networks that employ the same type of protocols but are operated by different entities. For example, the first access network 120 may be a first LTE network operated by a first entity and the second access network 130 may be a second LTE network operated by a second entity.

The first IP service network 150 and the second IP service network 160 may be an IP-based service network operated by a service provider or other type of entity. The first IP service network 150 and the second IP service network 160 may provide the electronic device 110 and the second electronic device 170 with IP-based communication services (e.g. multimedia services). For example, the first IP service network 150 and the second IP service network 160 may be an IMS network operated by a first entity. In one embodiment, the first IP service network 150 may be a first IMS network operated by a first entity, and the second IP service network 160 may be a second IMS network operated by a second entity In another embodiment, the first IP service network 150 or the second IP service network 160 may be an IP service network operated by a third party service provider affiliated with the entity of an IMS network Note: The aforementioned deleted statements can limit enforcement of the claims, but will not assist in finding infringement.

When the first access network 120 and the first IP service network 150 are operated by a first entity, an interface for control or cooperation may be arranged between the first access network 120 and the first IP service network 150. For example, the first entity may allocate radio resources of the first access network 120 first to a service or paid subscriber of the first IP service network 150 and then to a non-service or free subscriber thereof. Alternatively, the first entity may allocate radio resources of the first access network 120 according to priorities of services (e.g. voice, video or text not necessarily in that order) provided by the first IP service network 150. For example, when the electronic device 110 receives a voice service with a higher priority from the first IP service network 150, the first entity may allocate radio resources (e.g. channels) of the first access network 120 first to the electronic device 110 and then to another electronic device receiving a text service with a lower priority.

The second electronic device 170 may include a modem 173. The second electronic device 170 may includes components similar to those of the electronic device 110. For example, the second electronic device 170 may communicate with the electronic device 110 through the first access network 120 and the second access network 130 or the first IP service network 150 and the second IP service network 160.

The electronic device 110 may connect to or register in multiple access networks operated by different entities. The electronic device 110 may have multiple pieces of subscriber information corresponding respectively to multiple access networks. For example, the electronic device 110 may use multiple SIM card slots to acquire multiple pieces of SIM information. The electronic device 110 may include a first SIM card corresponding to a first entity and a second SIM card corresponding to a second entity. The communication control module 116 may utilize information from the first SIM card information (or first subscriber information) to connect to the first access network 120 of the first entity. The communication control module 116 may utilize information from the second SIM card information (or second subscriber information) to connect to the second access network 130 of the second entity. When the electronic device 110 (modem 133 or communication control module 116) supports multiple wireless connections at the same time, the electronic device may concurrently connect to the first access network 120 and the second access network 130. When the electronic device 110 is unable to support multiple wireless connections at the same time, the electronic device 110 may connect to just one of the first access network 120 and the second access network 130. Although the electronic device 110 has multiple pieces (i.e. portions) of subscriber information and supports multiple wireless connections, when only the first access network 120 of the first entity is available at the current location, the communication control module 116 may attach to the first access network 120 to receive a communication service. In some cases, the multiple pieces of subscriber information may include multiple pieces of identification information comprised of different formats corresponding respectively to different types of communication networks operated by the same entity. For example, each piece of subscriber information may include International Mobile Subscriber Identity (IMSI, identification information for an LTE network of a first entity), Public User Identity (PUI, identification information for an IMS network of the first communication entity), or a combination thereof. The multiple pieces of subscriber information may be stored in one SIM card, in an internal storage space (e.g. memory) of the electronic device 110, or in an external electronic device (e.g. server) communicatively coupled with the electronic device 110.

The electronic device 110 may obtain multiple pieces of subscriber information from an internal or external storage space and register corresponding subscriber information in each of multiple IP service networks. For example, when the electronic device 110 supports multiple wireless connections at the same time, the communication control module 116, which comprises hardware such as integrated circuitry configured for operation, may obtain a first address (e.g. IP address) through the first access network 120 and register in the first IP service network 150 on the basis of the first address. The communication control module 116 may also obtain a second address (e.g. IP address) through the second access network 130 and register in the second IP service network 160 on the basis of the second address. When the electronic device 110 supports one wireless connection at a time, the communication control module 116 may obtain an address through one of the first access network 120 and the second access network 130, and register in the first IP service network 150 and the second IP service network 160 on the basis of the address. Although the electronic device 110 supports multiple wireless connections, when only the first access network 120 of a first communication entity is available at the current location, the communication control module 116 may obtain an address through the first access network 120 and register in the first IP service network 150 and the second IP service network 160 on the basis of the address. Further information on attachment to or registration in the access network and IP service network is described with reference to FIGS. 3A and 3B.

Figure 2:
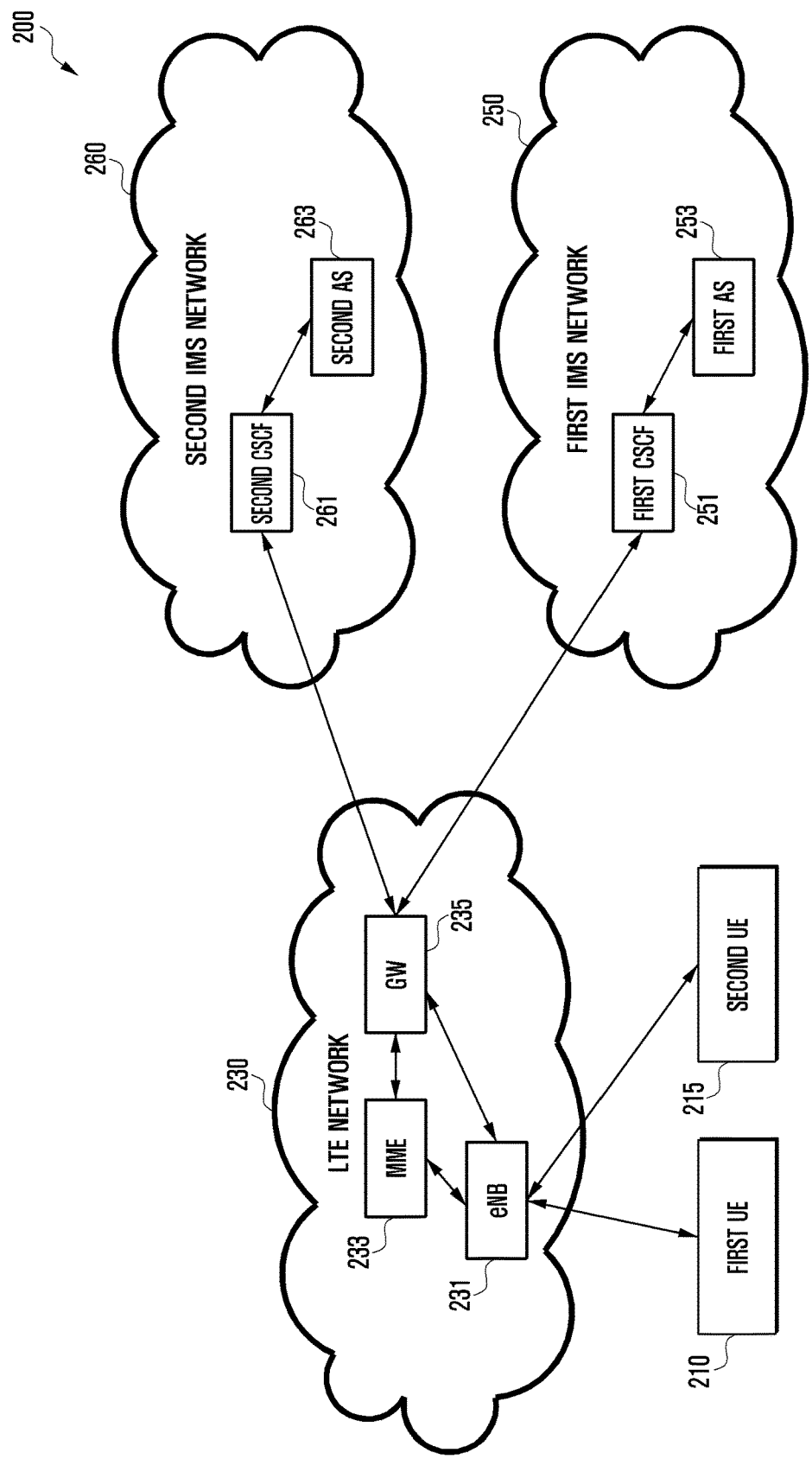
FIG. 2 illustrates one view of a communication system including an LTE access network according to an embodiment of the present disclosure.

FIG. 2 illustrates a communication system allowing access through an LTE network according to an embodiment of the present disclosure. In the following description, for ease of description and understanding, the communication system 200 is depicted as including an LTE network 230 as an access network. However, various embodiments of the present disclosure may be applied to different communication systems having various access networks other than LTE.

Referring now to FIG. 2, the communication system 200 may include a first user equipment (UE) 210, a second UE 215, an LTE network 230, a first IMS network 250, and a second IMS network 260. The communication system 200 may provide a communication service (e.g. voice service) between the first UE 210 and the second UE 215. The first UE 210 and the second UE 215 may each be the electronic device 110 that is described herein above. Each of the first UE 210 and the second UE 215 may include a modem (e.g. modem 133) and a communication control module (e.g. communication control module 116) and receive a communication service (e.g. IP-based voice service) of the communication system 200.

The LTE network 230 (e.g. first access network 120 or second access network 130) may include various electronic equipment, such as an Evolved Node B (eNB) 231, a Mobility Management Entity (MME) 233, and a gateway 235. The eNB 231 may be any of various types of hardware (e.g. base station) that provides a wireless interface (or wireless connection) between at least one UE (e.g. first UE 210) and the LTE network 230.

For example, the eNB 231 may control setup of a wireless connection to the first UE 210 and control radio resources (e.g. frequencies) allocated to the wireless connection.

With continued reference to FIG. 2, the MME 233 may manage connections of one or more UEs attached to the eNB 231. For example, when the first UE 210 attaches to the LTE network 230, the MME 233 may authenticate the first UE 210 and keep track of movement of the first UE 210 for continued communication service. The gateway 235 may include a serving gateway (S-GW) and a Packet Data Network (PDN) gateway (P-GW). For example, the gateway 235 may perform packet routing between the LTE network 230 and an external network (e.g. Internet or IMS network), provide a firewall therebetween, and assign an address (e.g. IP address) to one or more UEs. In some cases, the LTE network 230 may include multiple instances of one or more various such as the eNB 231, the MME 233, and the gateway 235.

The first IMS network 250 (i.e. first IP service network 150) may include entities such as a first Call Session Control Function (CSCF) 251 and a first Application Server (AS) 253. For example, the first IMS network 250 may be an IP service network operated by a first communication entity and may provide IP-based multimedia services to subscribers. The first CSCF 251 may include at least one of Proxy Call Session Control Function (P-CSCF), Serving Call Session Control Function (S-CSCF) and Interrogating Call Session Control Function (I-CSCF). In response to a registration request from the first UE 210, the first CSCF 251 may register the first UE 210 in the first IMS network 250. The first CSCF 251 may support a call establishment function of the first IMS network 250. The first AS 253 supports services provided through the first IMS network 250 and may include a Telephony Application Server (TAS) or a Voice Call Continuity (VCC) server. The TAS may provide UEs with a multimedia supplementary service (e.g. calling number identification or ringback tone). The VCC server may provide UEs with seamless handover between heterogeneous networks (e.g. CDMA network and IMS network). In response to a call request for a different UE (e.g. second UE 215) from the first UE 210, the first AS 253 may establish a dummy call to the first UE 210. In response to a dummy call request from the first UE 210, the first AS 253 may establish a dummy call to the first UE 210. Further information on operations of the first AS 253 is provided with reference to FIGS. 4 and 5.

The second IMS network 260 (i.e. second IP service network 160) may include entities such as a second CSCF 261 and a second AS 263. The second IMS network 260 may be an IP service network operated by a second communication entity. The second IMS network 260 may include various types of devices that are identical or similar to those of the first IMS network 250.

The first UE 210 (or the second UE 215) may connect to the LTE network 230. For example, the first UE 210 may send a connect request to the LTE network 230 through a wireless connection with the eNB 231. In response to the connect request from the first UE 210, the MME 233 may authenticate the first UE 210 and send a registration request (e.g. create session request) for the first UE 210 to the gateway 235. In response to the registration request, the gateway 235 may allocate at least one address (e.g. IP address) to the first UE 210. The LTE network 230 may utilize the address allocated to the first UE 210 to establish a connection between the first UE 210 and an external network (e.g. Internet or first IMS network 250).

The first UE 210 may register in the second IMS network 260 through the LTE network 230. For example, the first UE 210 (communication control module 116) may send a registration request (e.g. connect) to the LTE network 230 (e.g. P-GW) corresponding to the first subscriber information. In response to the registration request, the LTE network 230 may allocate at least one address (e.g. IP address) to the first UE 210. The first UE 210 may utilize the allocated address to send a registration request (e.g. Session Initiation Protocol register) to the second IMS network 260.

The LTE network 230 and the second IMS network 260 may be operated by different communication entities. In this case, the LTE network 230 may not allocate radio resources first to the first UE 210 receiving a call service through the second IMS network 260. To allow the first UE 210 to receive a call service with short delay, the LTE network 230 may allocate radio resources first to the first UE 210, and then to the other UEs or services. For example, the LTE network 230 may create a bearer corresponding to the call service of the first UE 210.

To receive an allocation of radio resources through the LTE network 230, the first UE 210 may set up an additional call (e.g. "dummy call") with at least one external device through the first IMS network 250. For example, the first UE 210 may set up an additional call through the LTE network 230 and the first IMS network 250, causing the LTE network 230 to allocate radio resources to the first UE 210. The at least one external device may include an entity that may issue an IMS call request conforming to the standard (e.g. AS or UE). Further information on an additional call setup is provided with reference to FIGS. 4 and 5.

In various embodiments, for an electronic device seeking to receive communication services through an access network (e.g. LTE network 230) and multiple IMS networks including at least a first IMS network (e.g. first IMS network 250) and a second IMS network (e.g. second IMS network 260), the electronic device (e.g. electronic device 110 or first UE 210) may include a modem (e.g. modem 113) and a communication control module (e.g. communication control module 116) including a processor.

The communication control module may, via the modem, connect to the access network on the basis of information on the access network (e.g. first identification information) among first subscriber information associated with a first entity, and register the electronic device in the first IMS network via the access network on the basis of information on the first IMS network (e.g. second identification information) among the first subscriber information associated with the first entity.

The communication control module may be configured to register the electronic device in the second IMS network operated by a second entity via the access network on the basis of information on the second IMS network (e.g. third identification information) among the second subscriber information associated with the second entity.

The communication control module may obtain the first to third identification information through at least one SIM card installed in the electronic device. Alternatively, the communication control module may obtain the first to third identification information through at least one server (e.g. Home Subscriber Server (HSS)) included in the access network or the multiple IMS networks.

The communication control module may obtain at least one address (e.g. IP address or identifier for the electronic device) from the access network, and send a registration request (e.g. SIP Register) containing the at least one address to the second IMS network through the access network. In response to the registration request, the second IMS network may register the electronic device therein and provide a service to the electronic device.

The communication control module may obtain address information of the second IMS network from a subscriber identification module functionally connected to the electronic device or from an external server. The external server may be a Domain Name Server (DNS) or Open Mobile Alliance Device Management (OMA DM). The communication control module may send a registration request containing the address information to the second IMS network through the access network. In response to the registration request, the CSCF (e.g. second CSCF 261) of the second IMS network may register the electronic device in the second IMS network 260.

The communication control module may utilize the third identification information (e.g. second PUI, SEC@second.com) to send a first call request (e.g. Invite using SEC@second.com) to another device (e.g. second UE 215) through the access network and second IMS network. Here, the first call request may be initiated by the user of the electronic device. The first call request may be a call request that is made directly by the user having selected the second subscriber information. In response to the first call request, the communication control module may utilize the second identification information (e.g. first PUI, SEC@first.com) to send a second call request (e.g. Invite using SEC@first.com) to at least one external device (e.g. second AS 253) through the access network and first IMS network. Here, the second call request may be sent automatically by the communication control module or sent by the user.

Through setup of the second call, the communication control module may create a bearer corresponding to a specified service (e.g. call service) between the electronic device and a specific entity (e.g. eNB 231) of the access network (e.g. LTE network 230). Here, the second call request may be an additional call (e.g. dummy call) for creating a bearer for a call service through the access network other than an actual call request for voice service between UEs (e.g. first UE 210 and second UE 215).

The communication control module may send a second call request containing codec information supported by the electronic device. For example, for setting up a call through the first IMS network, the communication control module may send a call request (e.g. Invite) containing codec information supported by the electronic device to negotiate a codec to be used for a call with a counterpart device (e.g. second UE 215). This use of a call request containing codec information is supported by the Session Description Protocol (SDP). Further information on codec negotiation is provided with referent to FIG. 4.

The communication control module may utilize the third identification information to send a call request (e.g. Invite using SEC@second.com) to another device (e.g. second UE 215) through the access network and second IMS network. Here, the call request may contain the second identification information (e.g. SEC@first.com). The call request may be a call request made by the user of the electronic device (e.g. first UE 210). For example, the call request may be a call request that is issued by a telephony application running on the electronic device utilizing the third identification information (or second subscriber information) as sender information and an address associated with the counterpart device (e.g. phone number).

The communication control module may receive a call request corresponding to the second identification information from an external device (e.g. second AS 263) through the access network and first IMS network 250. When the call request is a dummy call (or additional call) setup request for creating a bearer corresponding to a specified service between the electronic device and a specific entity of the access network, the communication control module may send a specified response (e.g. session progress) to the external device. The above response may be initiated by the communication control module (e.g. automatically) or user input. The communication control module may determine whether or not the call request is a dummy call request on the basis of information on the external device contained in the call request or information contained in a portion of the call request. For example, when the external device is a pre-specified external device or pre-specified information is contained in the call request, the call request may be determined as a dummy call request.

The communication control module may connect through the access network to a gateway of an additional access network (e.g. second access network 130) operated by the entity of the second IMS network, to obtain additional address information (e.g. IP address) from the gateway of an additional access network, and to send a registration request (e.g. SIP Register based on the third identification information) to the second IMS network 260 on the basis of the additional address information.

For example, the communication control module may send the access network a request for registration in the additional access network corresponding to the second subscriber information. Here, the registration request may be an additional packet data network connectivity request. The registration request may contain the second subscriber information. On the basis of the second subscriber information (e.g. fourth identification information, IMSI) contained in the registration request, the gateway of the access network (e.g. gateway 235) may forward the registration request to the gateway of the additional access network corresponding to the second subscriber information. The communication control module may receive allocation of at least one address from the gateway of the additional access network corresponding to the second subscriber information and send a registration request to the second IMS network on the basis of the at least one address.

The communication control module may obtain at least one address (e.g. IP address or identifier for the electronic device) from the access network, and send a registration request containing the least one address (e.g. SIP Register based on the second identification information) to the first IMS network through the access network. In addition, the communication control module may send a registration request containing the least one address (e.g. to SIP Register based on the third identification information) through the first IMS network (e.g. P-CSCF thereof) to the second IMS network (S-CSCF thereof). In response to the registration request, the second IMS network may register the electronic device therein and provide a service (e.g. voice call service) to the electronic device through the first IMS network.

In various embodiments, for an electronic device (e.g. electronic device 110 or first UE 210) seeking to receive communication services through an access network (e.g. LTE network 230) operated by a first entity and an IMS network (e.g. second IMS network 260) operated by a second entity, the electronic device may include a modem and a communication control module that utilizes a processor. Through use of the modem, the communication control module may connect to the access network on the basis of first subscriber information associated with the access network (e.g. subscriber information including the first identification information or second identification information). The communication control module may register the electronic device in the IMS network via the access network on the basis of second subscriber information associated with the IMS network (e.g. subscriber information including the third identification information).

The communication control module may utilize the first subscriber information to register the electronic device in a different IMS network (e.g. first IMS network 250) operated by the first entity via the access network. In response to a first call request corresponding to the second subscriber information, the communication control module 116 may send the first call request through the access network and the IMS network to a different device, and send a second call request corresponding to the first subscriber information through the access network and the different IMS network to at least one external device. Here, the first call request may be initiated by a user of the electronic device. The second call request may be a request for a dummy call setup.

The communication control module may send a call request corresponding to the second subscriber information to a different device through the access network and IMS network. The call request may include the first subscriber information and be initiated by the user of the electronic device. The first subscriber information contained in the call request may be used by at least one external device to send a dummy call request to the electronic device.

The communication control module may register the electronic device in a different IMS network associated with the first subscriber information through the access network, and receive a call request corresponding to the first subscriber information from at least one external device through the access network and different IMS network. When the call request is a dummy call request for creating a bearer corresponding to a specified service between the electronic device and a specific entity of the access network, the communication control module may send a specified response for a dummy call to the external device. The communication control module may determine whether the call request is a dummy call request on the basis of information regarding the external device contained in the call request or information contained in a portion of the call request.

Figure 3B:
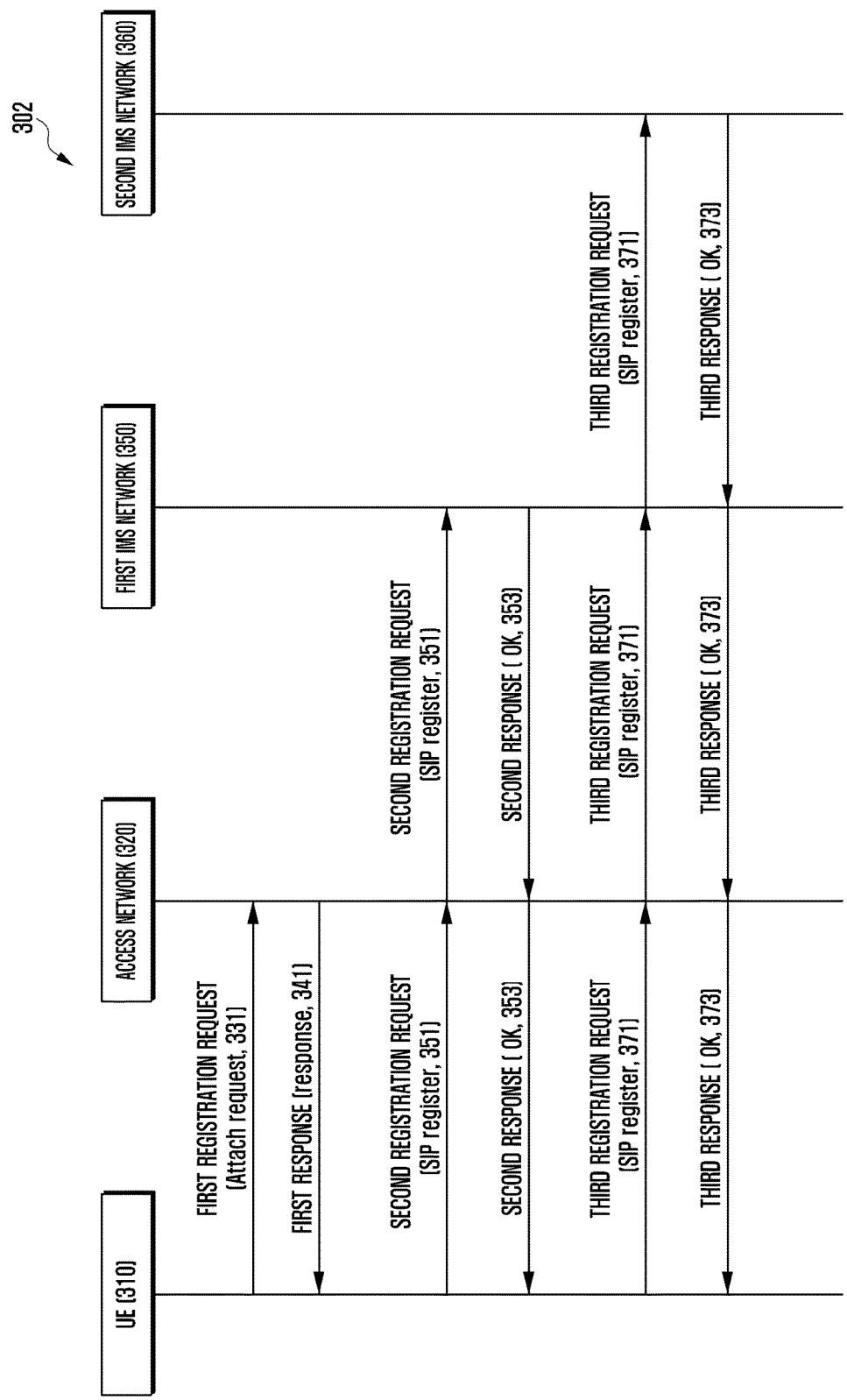
Figure 3C:
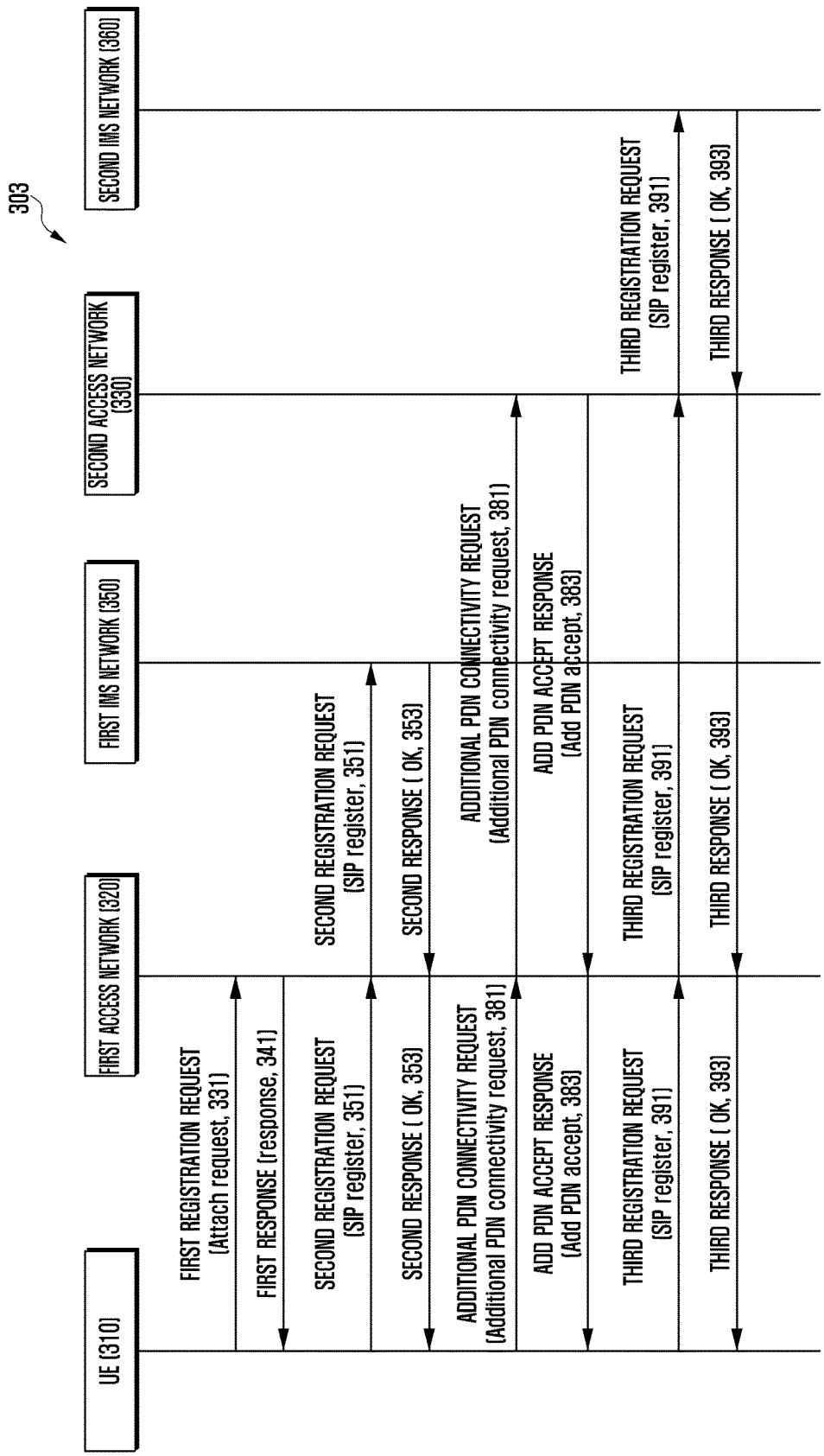

FIGS. 3A to 3C illustrate procedures 301 to 303 for registration in the access network and IMS network according to various embodiments of the present disclosure.

Referring now to FIG. 3A, in procedure 301, a user equipment (UE) 310 (e.g. electronic device 110) may register in a first IMS network 350 (e.g. first IP service network 150) and a second IMS network 360 (e.g. second IP service network 160) via an access network 320 (e.g. first access network 120).

At operation 331, the UE 310 sends to the access network (320) a first registration request (e.g. attach/connect request) containing first subscriber information (e.g. first identification information). The access network 320 registers the UE 310 therein on the basis of the first subscriber information contained in the first registration request. The access network 320 may be a network (e.g. LTE network or mobile WiMAX network) operated by an entity associated with the first subscriber information. For example, when the UE 310 is a subscriber of the above entity or a subscriber of a third party entity related with the entity, the electronic device 110 may register in the access network 320 for service reception.

At operation 341, the access network 320 sends to the UE 310 a first response as a reply to the first registration request. The first response may include an address (e.g. IP address) allocated to the UE 310. The first response may also include address information for the first IMS network 350.

At operation 351, the UE 310 sends to the first IMS network 350 a second registration request (e.g. SIP Register) on the basis of the first subscriber information (e.g. second identification information). The UE 310 may receive protocol configuration options (PCO) from the access network 320. The UE 310 may extract address information (e.g. IP address) of the first IMS network 350 from the PCO. The UE 310 may utilize the address information to send the second registration request to the access network 320. On the basis of the above address, the access network 320 (e.g. gateway 235) may forward the second registration request received from the UE 310 to the first IMS network 350.

At operation 353, in response to the second registration request, the first IMS network 350 registers the UE 310 therein and sends a second response (e.g. OK) to the UE 310.

At operation 361, the UE 310 sends to the second IMS network 360 a third registration request (e.g. SIP Register) based on second subscriber information (e.g. third identification information). The UE 310 may obtain an address of the second IMS network 360 from the PCO. The UE 310 may also obtain an address of the second IMS network 360 from the subscriber identity module or information stored in an external device (e.g. DNS or OMA DM). On the basis of the obtained address of the second IMS network, the UE 310 may send the third registration request to the access network 320, and the access network 320 (e.g. gateway) may forward the third registration request to the second IMS network 360.

At operation 363, in response to the third registration request, the second IMS network 360 registers the UE 310 therein and sends a third response (e.g. OK) to the UE 310.

Referring now to FIG. 3B, in procedure 302, the UE 310 may register in the first IMS network 350 and the second IMS network 360 via the access network 320.

Unlike procedure 301 depicted in FIG. 3A, the UE 310 may send a third registration request via the first IMS network 350 to the second IMS network 360.

At operation 331, the UE 310 sends to the access network 320a first registration request containing first subscriber information (e.g. first identification information).

At operation 341, the access network 320 sends to the UE 310 a first response as a reply to the first registration request.

At operation 351, the UE 310 sends via the access network 320 to the first IMS network 350 a second registration request based on the first subscriber information (e.g. second identification information).

At operation 353, in response to the second registration request, the first IMS network 350 registers the UE 310 therein and sends a second response to the UE 310.

At operation 371, the UE 310 sends to the second IMS network 360 via the access network 320 and first IMS network 350 a third registration request (e.g. SIP Register) based on second subscriber information (e.g. third identification information, PUI, SEC@second.com). For example, the UE 310 may send the third registration request to the first IMS network 350 via the access network 320. A specific entity (e.g. P-CSCF or I-CSCF) of the first IMS network 350 may forward the third registration request to a specific entity (e.g. S-CSCF or I-CSCF) of the second IMS network 360 on the basis of information contained in the third registration request (e.g. second subscriber information, SEC@second.com).

At operation 373, in response to the third registration request, the second IMS network 360 registers the UE 310 therein and sends a third response (e.g. OK) to the UE 310 via the first IMS network 350 and access network 320.

Referring now to FIG. 3C, in procedure 303, the UE 310 may register in the first IMS network 350 and the second IMS network 360 via the first access network 320. The first access network 320 may be the same as the access network 320 shown in FIG. 3A or 3B. Unlike procedure 301 or 302, the UE 310 may send a third registration request to the second IMS network 360 via the second access network 330.

At operation 331, the UE 310 sends to the first access network 320 a first registration request containing first subscriber information (e.g. first identification information).

At operation 341, the first access network 320 sends to the UE 310 a first response as a reply to the first registration request.

At operation 351, the UE 310 sends via the first access network 320 to the first IMS network 350, a second registration request based on the first subscriber information (e.g. second identification information).

At operation 353, in response to the second registration request, the first IMS network 350 registers the UE 310 therein and sends a second response to the UE 310.

At operation 381, the UE 310 sends an additional PDN connectivity request via the first access network 320 to a gateway (e.g. P-GW) of the second access network 330 (e.g. second access network 130) operated by the entity of the second IMS network. For example, the UE 310 may send an additional PDN connectivity request based on the second subscriber information (e.g. fourth identification information, IMSI) to the first access network 320. On the basis of information contained in the additional PDN connectivity request (e.g. second subscriber information or IP address), a specific entity (S-GW) of the first access network 320 may forward the additional PDN connectivity request to a specific entity (P-GW) of the second access network 330.

At operation 383, in response to the additional PDN connectivity request, the second access network 330 sends an add PDN accept response to the UE 310 via the first access network 320. The UE 310 may connect to the second access network 330 and obtain additional address information (e.g. IP address) at operations 381 and 383.

At operation 391, the UE 310 sends a third registration request (e.g. SIP Register) based on the second subscriber information (e.g. third identification information, PUI, SEC@second.com) to the second IMS network 360 via at least one entity (e.g. S-GW) of the first access network 320 and at least one entity (e.g. P-GW) of the second access network 330.

At operation 393, in response to the third registration request, the second IMS network 360 registers the UE 310 therein and sends a third response (e.g. OK) to the UE 310 via the second access network 330 and first access network 320.

Figure 4A:
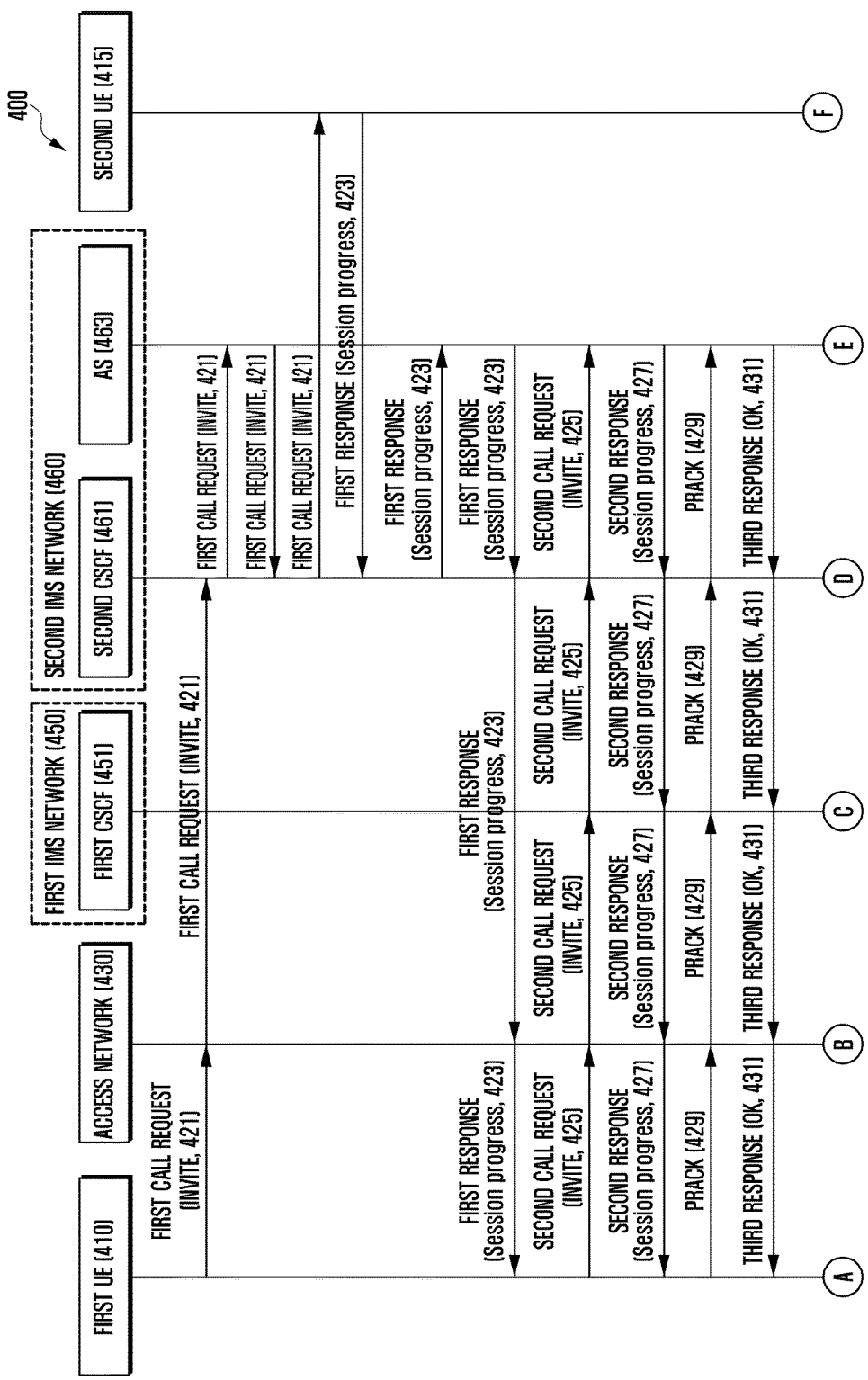
FIG. 4A and FIG. 4B illustrate operations for call establishment through a second IMS network according to an embodiment of the present disclosure.
Figure 4B:
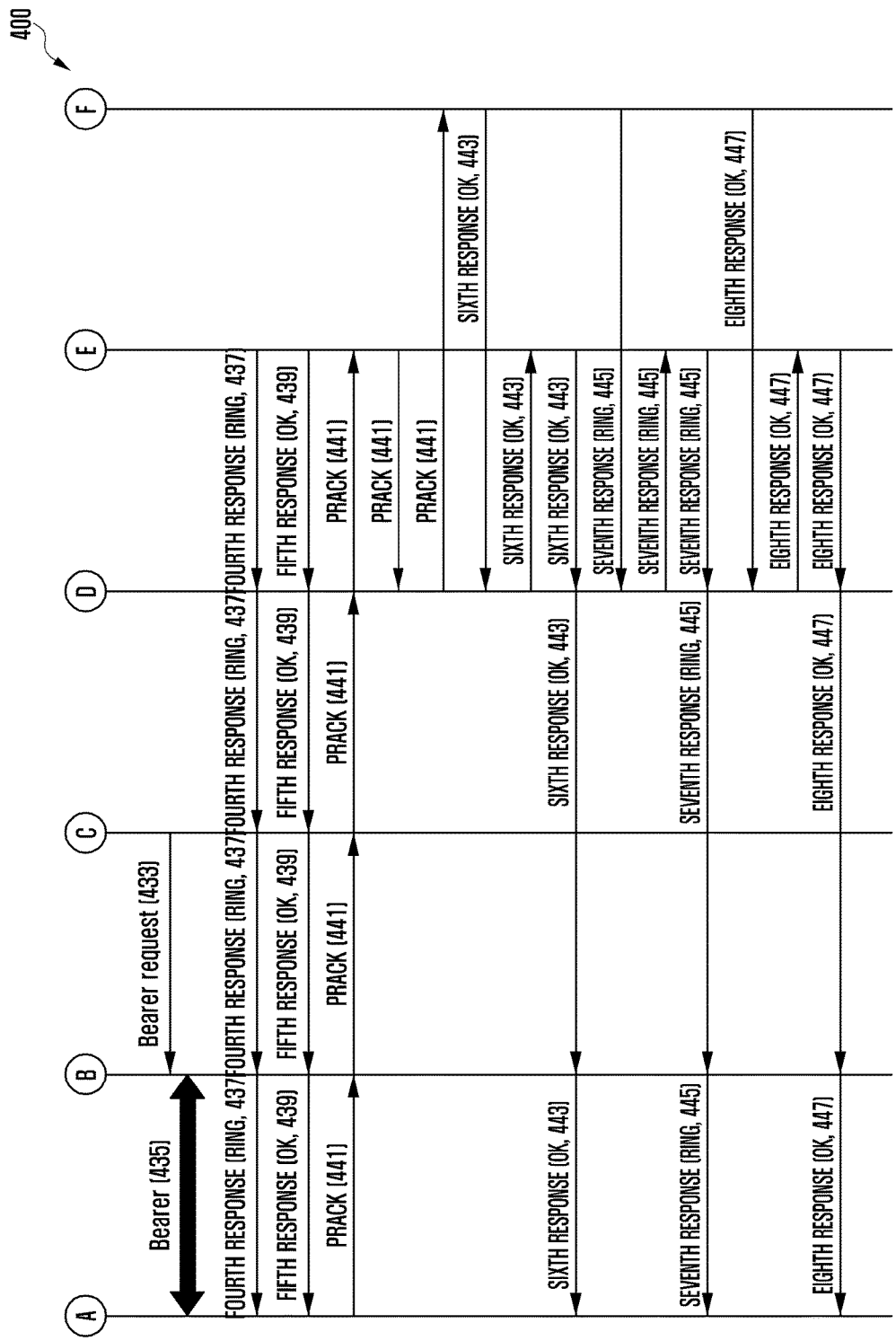

FIGS. 4A and 4B illustrate a procedure 400 for call establishment through a second IMS network according to an embodiment of the present disclosure.

Referring now to FIGS. 4A and 4B, the first UE 410 (e.g. electronic device 110) may set up a call to the second UE 415 (e.g. second electronic device 170) through the access network 430 (e.g. first access network 120), the first IMS network 450 (first CSCF 451 in particular), and the second IMS network 460 (e.g. first IMS network 1502, second CSCF 461 and AS 463 in particular).

At operation 421, the first UE 410 sends via the access network 430, second CSCF 461 and AS 463, a first call request (e.g. Invite) based on second subscriber information (e.g. SEC@second.com) to the second UE 415. Here, the first call request may include first codec information on the codec supported by the first UE 410 (e.g. first SDP offer). The first call request may include information on the first UE 410 (e.g. IP address or first subscriber information). The first call request may include information on the second UE 415 (e.g. third PUI, BOB@wherever.com). The first UE 410 may send the first call request to the access network 430. For example, the first UE 410 may send the first call request through a wireless interface to at least one entity (e.g. eNB 231) of the access network 430. On the basis of address information (e.g. address corresponding to the second IMS network 460) contained in the first call request, the access network 430 may forward the first call request to the second IMS network 460.

The first IMS network 450 may include, for example, the first CSCF 451, and the second IMS network 460 may include, for example, the second CSCF 461 (e.g. second CSCF 261) and the AS 463 (e.g. second AS 263). The second CSCF 461 may receive a first call request from an external network (e.g. access network 430), and forward the same to the AS 463. The AS 463 may modify or delete at least a portion (e.g. first codec information) of the first call request. The AS 463 may add new information to the first call request. The AS 463 may also store some information (e.g. information on the first UE 410 or first codec information) extracted from the first call request. In addition, the AS 463 may forward the received first call request to the second CSCF 461. On the basis of information on the second UE 415 extracted from the first call request, the second CSCF 461 may forward the first call request to the second UE 415. Forwarding of the first call request from the second CSCF 461 to the second UE 415 may be similar to forwarding of the first call request from the second CSCF 461 to the AS 463.

The first call request may be a call request initiated by the user of the first UE 410. For example, the first call request may be a call request initiated by the user utilizing the second subscriber information of the first UE 410 (e.g. sender information SEC@second.com) and an address corresponding to the second UE 415 (010-111-3333 or BOB@wherever.com). The user of the first UE 410 may enter or select an address corresponding to the second UE 415 (010-111-3333 or BOB@wherever.com) through, for example, the user interface.

At operation 423, in response to the first call request, the second UE 415 sends a first response (e.g. Session progress) to the first UE 410 via the access network 430, second CSCF 461, and AS 463. Here, the first response may include second codec information on the codec supported by the second UE 415 (e.g. answer to first SDP offer). The second codec information may indicate a codec supported by both the first UE 410 and the second UE 415. The second CSCF 461 may receive the first response from the second UE 415 and forward the same to the AS 463. The AS 463 may modify the first response or store at least a portion of the first response. For example, the AS 463 may store the second codec information. The AS 463 may forward the first response to the second CSCF 461. The second CSCF 461 may forward the first response to the access network 430, which may then forward the first response to the first UE 410.

At operation 425, the first UE 410 sends a second call request based on first subscriber information (e.g. SEC@first.com) to at least one external device (e.g. AS 463) via the access network 430, first CSCF 451 and second CSCF 461. Here, the second call request may be a dummy call request for creating a bearer through the access network 430. The second call request may include address information for the AS 463 (e.g. IP address or fourth PUI, AS@second.com). The second call request may include third codec information on a codec supported by the first UE 410 (e.g. second SDP offer). The first UE 410 may create the third codec information on the basis of the second codec information received at operation 423. The first UE 410 may send the second call request to the access network 430. The access network 430 may forward the second call request to the first CSCF 451 of the first IMS network 450. On the basis of address information of the AS 463 contained in the second call request, the first CSCF 451 may forward the second call request to the second CSCF 461, which may then forward the second call request to the AS 463.

At operation 427, in response to the second call request, the AS 463 sends a second response (e.g. session progress) to the first UE 410 via the second CSCF 461, first CSCF 451, and access network 430. Upon reception of the second call request, the AS 463 may send the first UE 410 a second response corresponding to information contained in the second call request. For example, the AS 463 may check whether the second call request matches the first subscriber information stored at operation 423, and send the second response to the first UE 410 if the second call request matches the first subscriber information. The AS 463 may create fourth codec information (e.g. answer to the second SDP offer) on the basis of information stored at operation 423 (e.g. second codec information) and add the fourth codec information to the second response, which is sent to the first UE 410.

At operation 429, upon reception of the second response, the first UE 410 sends a Provisional Response Acknowledgement (PRACK) to the AS 463 via the access network 430, first CSCF 451 and second CSCF 461.

At operation 431, in response to the PRACK, the AS 463 sends a third response (e.g. OK) to the first UE 410 via the second CSCF 461, first CSCF 451, and access network 430.

With reference to FIG. 4B, at operation 433, on the basis of the third response (e.g. OK), the first CSCF 451 sends a bearer creation request for a call service to the access network 430. For example, the first CSCF 451 may be aware of establishment of a second call between the first UE 410 and the AS 463 according to the third response, and send a bearer creation request to the access network 430 so as to ensure quality of a call service through the first IMS network.

At operation 435, upon reception of the bearer request, the access network 430 creates a bearer between the first UE 410 and the access network 430. Here, the access network 430 may allocate more resources (e.g. channel, frequency and time) to the first UE 410 than before bearer creation.

At operation 437, the AS 463 may a fourth response (e.g. Ring) to the first UE 410.

At operation 439, the AS 463 may send a fifth response (e.g. OK) to the first UE 410. Through operations 425 to 439, the second call between the first UE 410 and the AS 463 may be established through the first IMS network 450 (e.g. first CSCF 451). To maintain the bearer, the first UE 410 may exchange additional data (e.g. voice data or signaling data) with the AS 463 through the first CSCF 451.

At operation 441, the first UE 410 may send a PRACK related with first call setup to the second UE 415. For example, the first UE 410 may send a PRACK, as a reply to the first response received at operation 423, to the second UE 415. The first UE 410 may send the second UE 415 a PRACK as a reply to at least one of operations 425, 427, 429, 431, 437 and 439. Here, the PRACK may include fifth codec information on a codec supported by the first UE 410. The first UE 410 may determine the fifth codec information on the basis of at least one of the second codec information and fourth codec information.

At operation 443, upon reception of the PRACK, at operation 443, the second UE 415 may send a sixth response (e.g. OK) to the first UE 410.

At operation 445, the second UE 415 may send a seventh response (e.g. Ring) to the first UE 410; and, at operation 447, the second UE 415 may send an eighth response (e.g. OK) to the first UE 410, thereby establishing the first call connection with the first UE 410. The first UE 410 may utilize the bearer created at operation 435 to send data through the first call connection to the second UE 415. Operations 421 to 447 may be an operation provided in the IMS standard. Although operations 421 to 447 are described in sequence for call setup, the sequence between them may be altered, some of them may be omitted, and another operation may be added. The words "in response to", "upon reception of" or "as a reply to" used in the above description are used only for understanding and do not constitute a condition or requirement for an operation.

Figure 5:
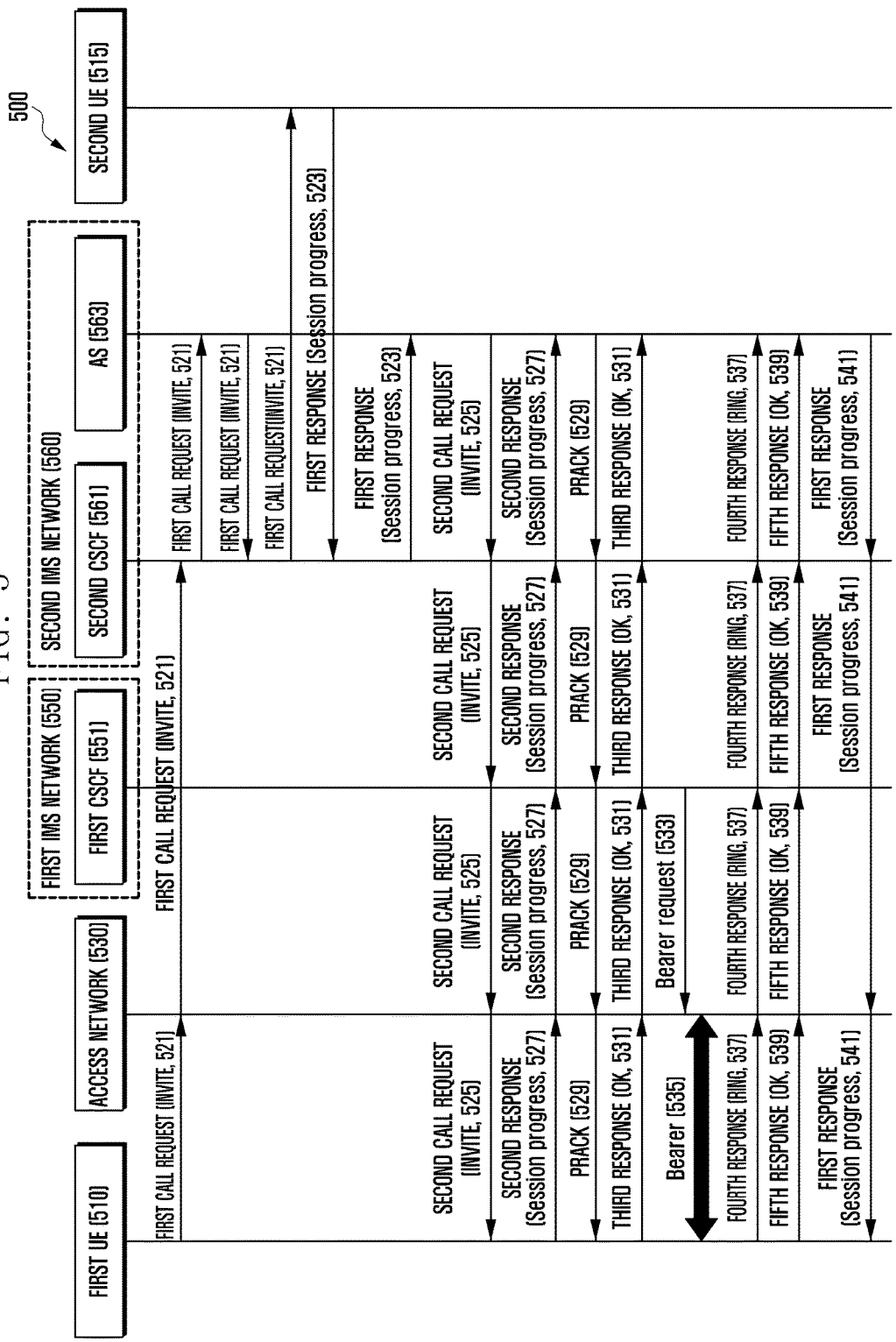
FIG. 5 illustrates operations for call establishment through a second IMS network according to another embodiment of the present disclosure.

FIG. 5 illustrates a procedure 500 for call establishment through a second IMS network 560 according to an embodiment of the present disclosure. Some operations of the procedure 500 for call establishment through the second IMS network 560 may be identical or similar to those of the procedure 400 for call establishment through the second IMS network 460 in FIG. 4. Unlike FIG. 4 wherein the electronic device (e.g. first UE 410) sends a request for second call setup to an external device (e.g. AS 463), an external device sends a request for second call setup to the electronic device in FIG. 5.

Referring now to FIG. 5, the first UE 510 (e.g. electronic device 110) may set up a call to the second UE 515 (e.g. second electronic device 170) through the access network 530 (e.g. first access network 120) and the second IMS network 560 (e.g. second IMS network 160.

At operation 521, the first UE 510 sends to the second UE 515 via the access network 530, second CSCF 561 and AS 563, a first call request (or first request) based on second subscriber information (e.g. SEC@second.com). Here, the first call request may include first codec information on the codec supported by the first UE 510 (e.g. first SDP offer). The first call request may include information on the first UE 510 (e.g. IP address or first subscriber information). The first UE 510 may insert information corresponding to a bearer creation request for the AS 563 or to a second call (e.g. dummy call) setup request in the first call request. The first call request may be a call request initiated by the user of the first UE 510. The first call request may be sent through the access network 530, second CSCF 561 and AS 563 to the second UE 515. The AS 563 may store at least partial information related to the first call request (e.g. first subscriber information). The AS 563 may determine whether to send a second call (e.g. dummy call) setup request to the first UE 510 on the basis of information contained in the first call request.

At operation 523, in response to the first call request, the second UE 515 sends a first response (e.g. Session progress) to the AS 563 via the second CSCF 561. Here, the first response may include second codec information on the codec supported by the second UE 515 (e.g. answer to first SDP offer). The second UE 515 may send the first response to the second CSCF 561, which may then forward the first response to the AS 563. The AS 563 may modify or store a portion of the first response. For example, the AS 563 may store the second codec information.

At operation 525, upon reception of the first response, the AS 563 sends a second call request corresponding to the first subscriber information (e.g. SEC@first.com) to the first UE 510 via the second CSCF 561, first CSCF 551 and access network 530. In one embodiment, the AS 563 may send the second call request first to the first UE 510 and then send the first response. The AS 563 may send the second call request to the second CSCF 561, which may then forward the second call request to the first CSCF 551. On the basis of information contained in the second call request (e.g. first subscriber information), the first CSCF 551 may regard the second call request as a call request for the electronic device receiving a communication service from the first IMS network (i.e. IMS network including the first CSCF 551). The first CSCF 551 may send the second call request to the first UE 510 via the access network 530.

At operation 527, upon reception of the second call request, the first UE 510 sends a second response (e.g. Session progress) to the AS 563 via the access network 530, first CSCF 551, and second CSCF 561. When a call request (e.g. second call request) is received from at least one external device (e.g. AS 563), the first UE 510 may determine whether the call request is an additional call (e.g. dummy call) request for creating a bearer through the access network 530. If the call request is a dummy call request, the first UE 510 may automatically establish a call with the at least one external device. That is, the first UE 510 may establish a dummy call connection without obtaining approval of the user. The first UE 510 may notify the user of creation of a dummy call connection with the AS 563 through a notification message or may obtain approval of the user for creation of a dummy call connection.

At operation 529, upon reception of the second response, the AS 563 sends a PRACK to the first UE 510 via the second CSCF 561, first CSCF 551 and access network 530.

At operation 531, upon reception of the PRACK, the first UE 510 sends a third response (e.g. OK) to the AS 563. At operation 533, the first CSCF 551 sends a bearer creation request to the access network 530 as a response to at least one of operations 525 to 531.

At operation 535, upon reception of the bearer creation request, at operation 535, the access network 530 creates a bearer for the first UE 510.

At operation 537, the first UE 510 may send a fourth response (e.g. Ring) to the AS 563.

At operation 539, the first UE 510 may send a fifth response (e.g. OK) to the AS 563.

At operation 541, the AS 563 sends the first response, which is the same or partially modified version of the first response received at operation 523, to the first UE 510 via the second CSCF 561 and access network 530 as a response to at least one of operations 525 to 539. Thereafter, a call connection corresponding to the first call request may be established between the first UE 510 and the second UE 515 according to the procedure provided in the IMS standard. Operations 521 to 541 may be an operation provided in the IMS standard. Although operations 521 to 541 are described in sequence for call setup, the sequence between them may be altered, some of them may be omitted, and another operation may be added.

Although not shown, when the first UE 510 is registered in the second IMS network 560 via the first IMS network 550, the first UE 510 may establish a call connection corresponding to the second subscriber information (e.g. SEC@second.com) with the second UE 515 via the access network 530, first IMS network 550 and second IMS network 560. In other words, the first UE 510 may establish a call connection with the second UE 515 through the entities having been traversed to register in the second IMS network 560. In one embodiment, the first UE 510 may send a call request corresponding to the second subscriber information (e.g. SEC@second.com) to the access network 530. On the basis of an address contained in the call request (e.g. address associated with the first IMS network 550), the access network 530 may forward the call request to the first CSCF 551 (e.g. P-CSCF). On the basis of information contained in the call request (e.g. second subscriber information), the first CSCF 551 may forward the call request to the second CSCF 561 (e.g. S-CSCF). The second CSCF 561 may forward the call request to the second UE 515. The second UE 515 may send a first response (e.g. Session progress) to the first UE 510 via the second CSCF 561, first CSCF 551 and access network 530.

Upon reception of the first response, the first UE 510 may send a PRACK to the second UE 515 via the access network 530, first CSCF 551, and second CSCF 561. Upon reception of the PRACK, the second UE 515 may send a second response (e.g. OK) to the first UE 510 via the second CSCF 561, first CSCF 551 and access network 530. Upon reception of the second response, the first CSCF 551 may request the access network 530 to create a bearer for a call service. In response to the bearer creation request, the access network 530 may create a bearer between the first UE 510 and the access network 530. Thereafter, the first UE 510 may establish a call connection with the second UE 515 and receive a call service according to the procedure provided in the IMS standard.

Figure 6:
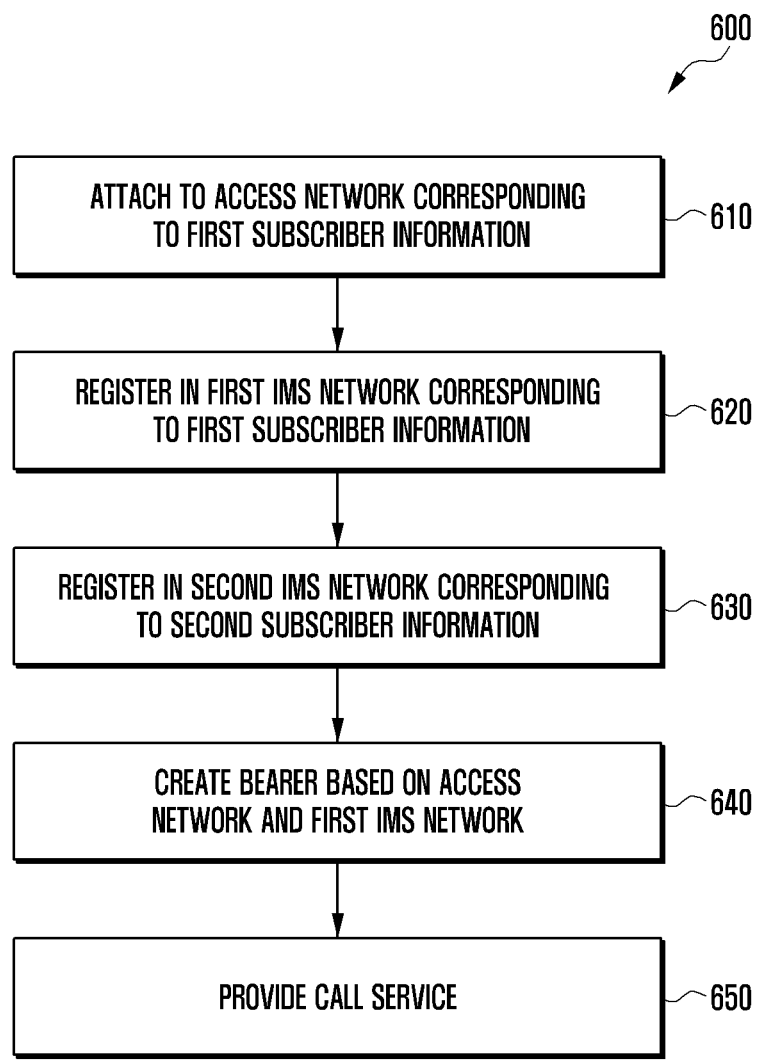
FIG. 6 illustrates a communication method for supporting multiple IMS networks according to an embodiment of the present disclosure.

FIG. 6 illustrates a communication method for supporting multiple IMS networks according to an embodiment of the present disclosure.

Referring now to FIG. 6, at operation 610, the electronic device (e.g. first UE 210) connects to an access network (e.g. LTE access network 230) corresponding to first subscriber information (e.g. first IMSI or subscriber information containing a first PUI) by use of a communication control module (e.g. communication control module 116) and a modem (e.g. modem 113). The electronic device may obtain at least one address (e.g. IP address) from the access network.

At operation 620, the electronic device registers in a first IMS network (e.g. first IMS network 250) corresponding to the first subscriber information. On the basis of the at least one address and first subscriber information, the electronic device may send a registration request to the first IMS network.

At operation 630, the electronic device registers in a second IMS network (e.g. second IMS network 260) corresponding to second subscriber information (e.g. second IMSI or subscriber information containing a second PUI). On the basis of the at least one address and second subscriber information, the electronic device may send a registration request to the second IMS network.

At operation 640, the electronic device creates a bearer on the basis of the access network and the first IMS network. For example, the electronic device may establish a dummy call connection with at least one external device (e.g. second AS 263) through the first IMS network, which may then send a bearer creation request to the access network. In response to the bearer creation request, the access network may create a bearer between the electronic device and the access network.

At operation 650, the electronic device provides a call service to the user through the access network and second IMS network.

According to various embodiments, the communication method for supporting multiple IMS networks may include connecting an electronic device (e.g. electronic device 110) to an access network (e.g. first access network 120) corresponding to first identification information by use of a modem (e.g. modem 113) functionally connected with the electronic device. The communication method may include registering, via the access network, the electronic device in a first IMS network (e.g. first IMS network 250) corresponding to second identification information, and registering the electronic device in a second IMS network (e.g. second IMS network 260) corresponding to third identification information. Here, the first identification information and the second identification information may be the same and be a portion of first subscriber information. The third identification information may be the same as the second identification information and be a portion of second subscriber information.

Connecting to the access network may include sending a registration request containing an IMSI as second identification information.

Registering the electronic device in the second IMS network may include obtaining at least one address (e.g. IP address) from the access network and sending a registration request containing the at least one address to the second IMS network.

The communication method may also include sending a first call request corresponding to the third identification information to a different device (e.g. electronic device of a different user) through the access network and second IMS network. The communication method may include sending, in response to the first call request, a second call request corresponding to the second identification information to at least one external device (e.g. first AS 253 or second AS 263) via the access network and first IMS network. Here, the second call request may include codec information of the different device. The electronic device may receive a response for the first call request from the different device and obtain codec information of the different device on the basis of information contained in the response.

The communication method may also include sending a call request corresponding to the third identification information to a different device through the access network and second IMS network, wherein the call request may contain the second identification information.

The communication method may also include receiving a call request corresponding to the second identification information from at least one external device through the access network and first IMS network, and sending, when the call request is a dummy call request for creating a bearer corresponding to a call service between the electronic device and a specific entity (e.g. eNB 231) of the access network, a specified response to the external device. Receiving a call request corresponding to the second identification information may include determining whether the external device is a specified one or the received call request contains specified information, and regarding the call request as a dummy call request on the basis of the determination result.

Figure 7:
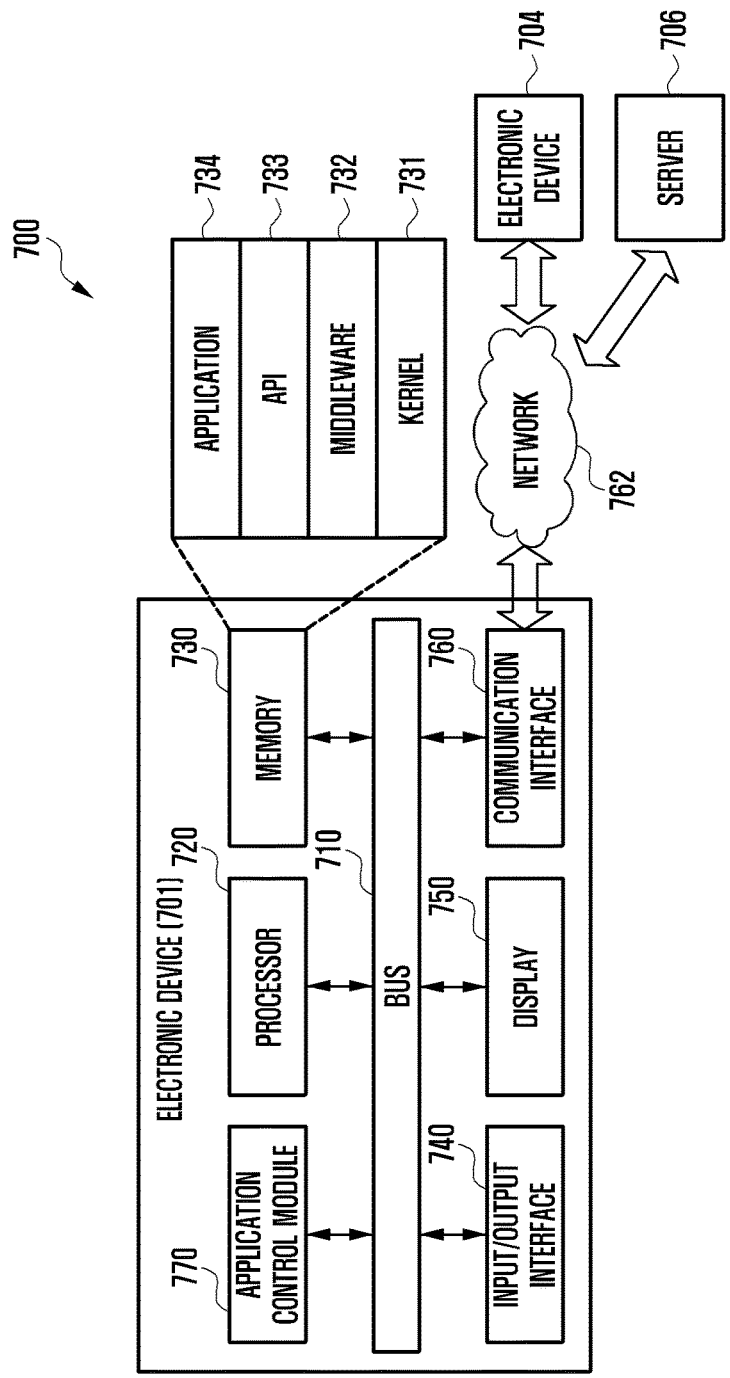
FIG. 7 illustrates a network environment involving electronic devices according to various embodiments of the present disclosure.

FIG. 7 is a diagram illustrating a network environment including electronic devices.

Referring now to FIG. 7, the electronic device 701 (e.g. electronic device 110) may include a bus 710, a processor 720, a memory 730, an input/output interface 740, a display 750, a communication interface 760, and a communication control module 770.

The bus 710 connects the aforementioned components to each other and may be a circuit of exchanging signals (e.g. control messages) among the components.

For example, the processor 720 receives a command from any of the aforementioned components (e.g. memory 730, input/output interface 740, display 750, communication interface 760, and communication control module 770) through the bus 710, interprets the command, and executes operation or data processing according to the decrypted command. For example, the processor 720 includes at least a part of the communication control module 116. For example, the processor 720 may perform at least a part of the multimedia control function.

The memory 730 may store the command or data received from the processor 720 or other components (e.g. input/output interface 740, display 750, communication interface 760, communication control module 770, etc.) or generated by the processor 720 or other components. The memory 730 may store program modules including kernel 731, middleware 732, Application Programming Interface (API) 733, applications 734, etc. Each programming module may be implemented as machine executable code, hardware, and any combination thereof.

The kernel 731 may control or manage the system resources (e.g. bus 710, processor 720, and memory 730) for use in executing the operation or function implemented with the middleware 732, the API 733, or the application 734. The kernel 731 also may provide an interface allowing the middleware 732, API 733, or application 734 to access the components of the electronic device 701 to control or manage.

The middleware 732 may work as a relay of data communicated between the API 733 or application 734 and the kernel 731. The middle 732 may execute control of the task requests from the applications 734 in such a way of assigning priority for use of the system resource (e.g. bus 710, processor 720, and memory 730) of the electronic device to at least one of the applications 734.

The API 733 is the interface for the applications 734 to control the function provided by the kernel 731 or the middleware 732 and may include at least one interface or function (e.g. command) for file control, window control, image control, or text control.

According to various embodiments, the applications 734 may include Short Messaging Service/Multimedia Messaging Service (SMS/MMS) application, email application, calendar application, alarm application, health care application (e.g. application of measuring quantity of motion or blood sugar level), and environmental information application (e.g. atmospheric pressure, humidity, and temperature applications). Additionally or alternatively, the application 734 may be an application related to information exchange between the electronic device 701 and other external electronic device (e.g. electronic device 704). Examples of the information exchange application may include a notification relay application for relaying specific information to the external electronic device and a device management application for managing the external electronic device.

For example, the notification relay application may be provided with a function of relaying the alarm information generated by the other applications (e.g. SMS/MMS application, email application, health care application, and environmental information application) of the electronic device 701 to an external electronic device (e.g. electronic device 704).

Additionally or alternatively, the notification relay application may provide the user with the notification information received from an external electronic device (e.g. electronic device 704). The electronic device application may manage (e.g. install, delete, and update) the function of an external electronic device (e.g. turn-on/off of the electronic device 704 itself (or a part of it) or adjustment of the brightness (or resolution) of the display) which communicates with the electronic device 701 or the service (e.g. communication or messaging service) provided by the external electronic device or an application running on the external device.

According to various embodiments of the present disclosure, the applications 734 may include an application designated according to the property (e.g. type) of an external electronic device (electronic device 704). If the external electronic device is the MP3 player, the applications 734 may include a music playback application. Similarly, if the external electronic device is a mobile medical appliance, the applications 734 may include a heal care application. According to an embodiment, the application 734 may include at least one of applications designated to the electronic device 701 or the applications received from the external electronic device (e.g. server 706 and electronic device 704).

The input/output interface 740 delivers the command or data input by the user through with an input/output device (e.g. sensor, keyboard, and touchscreen) to the processor 720, memory 730, communication interface 760, and/or communication control module 770 through the bus 710. For example, the input/output interface 740 may provide the processor 720 with the data corresponding to the touch may by the user on the touchscreen. The input/output interface 740 may output the command or data (which is received from the processor 720, memory 730, communication interfaced 760, or the communication control module 116 through the bus 710) through the input/output device (e.g. speaker and display). For example, the input/out interface 740 may output the voice data processed by the processor 720 to the user through the speaker.

The display 750 may present various informations (e.g. multimedia data and text data) to the user.

The communication interface 760 (e.g. modem 113) may establish a communication connection of the electronic device 701 with an external device (e.g. electronic device 704 and server 706). For example, the communication interface 760 connects to the network 762 through a wireless or wired link for communication with the external device. Examples of the wireless communication technology may include wireless fidelity (Wi-Fi), Bluetooth (BT), Near Field Communication (NFC), Global Positioning System (GPS), and cellular communication technology (e.g. Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology may include Universal Serial Bus (USB), High Definition Multimedia Interface (HDMI), Recommended Standard 232 (RS-232), and Plain Old Telephone Service (POTS).

According to an embodiment, the network 762 may be a telecommunication network. The communication network may include at least one of computer network, Internet, Internet of Things, and telephone network. According to an embodiment, the communication protocol between the electronic device 701 and an external device (e.g. transport layer protocol, data link layer protocol, and physical layer protocol) may be supported by at least one of the applications 734, API 733, middleware 732, kernel 731, and communication interface 760.

The communication control module 770 (e.g. communication control module 116) may control communication with at least one access network or at least one IP service network through the communication interface 760. For example, the communication control module 770 may register the electronic device 701 in a communication network corresponding to the first subscriber information. The communication control module 770 may register the electronic device 701 in a first IMS network corresponding to the first subscriber information via the communication network. The communication control module 770 may register the electronic device 701 in a second IMS network corresponding to the second subscriber information via the communication network. The communication control module 770 may create a bearer corresponding to a call connection through the access network and first IMS network. The communication control module 770 may provide a voice service to the user by use of the bearer through the access network and second IMS network.

Figure 8:
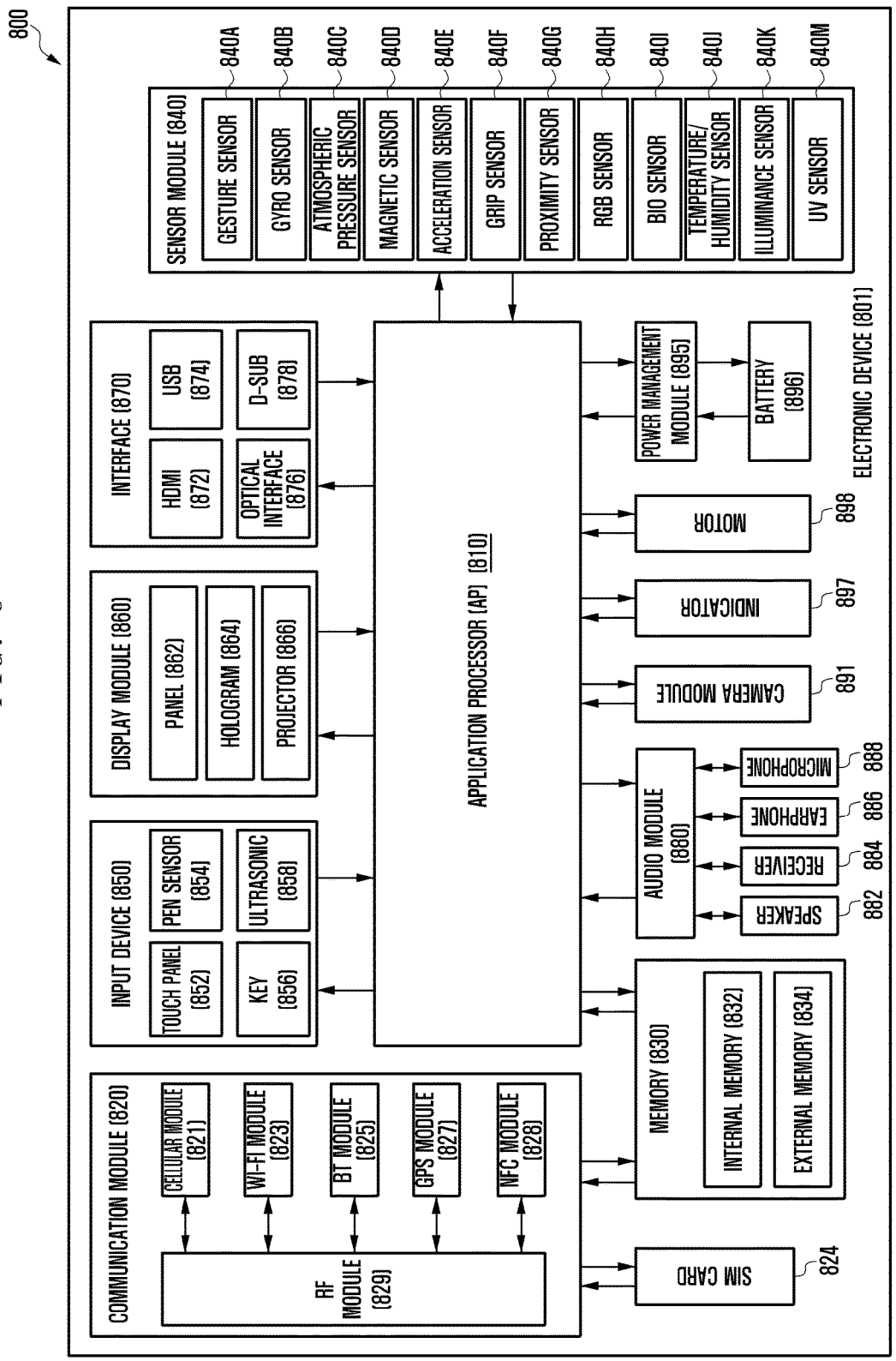
FIG. 8 is a block diagram of an electronic device according to various embodiments of the present disclosure.

FIG. 8 is a block diagram illustrating a configuration of the electronic device according to various embodiments of the present disclosure. The electronic device 801 (e.g. electronic device 110) may be of the whole or a part of the electronic device 801.

Referring now to FIG. 8, the electronic device 801 may include an Application Processor (AP) 810, a communication module 820, a Subscriber Identity Module (SIM) card 824, a memory 830, a sensor module 840, an input device 850, a display 860, an interface 870, an audio module 880, a camera module 891, a power management module 895, a battery 896, an indicator 897, and a motor 898.

The AP 810 may operate an Operating System (OS) and/or application programs to control a plurality of hardware and/or machine executable code connected to the AP 810 and perform data-processing and operations on multimedia data. For example, the AP 810 may be implemented in the form of System on Chip (SoC). According to an embodiment, the AP 810 may include a Graphic Processing Unit (GPU) (not shown).

The communication module 820 (e.g. communication interface 760) may perform data communication with other electronic devices (e.g. electronic device 704 and server 706) through a network. According to an embodiment, the communication module 820 may include a cellular module 821, a Wi-Fi module 823, a BT module 825, a GPS module 827, an NFC module 828, and a Radio Frequency (RF) module 829.

The cellular module 821 is responsible for voice and video communication, text messaging, and Internet access services through a communication network (e.g. LTE, LTE-A, CDMA, WCDMA, UMTS, WiBro, and GSM networks). The cellular module 821 may perform identification and authentication of electronic devices in the communication network using the SIM card 824. According to an embodiment, a subscriber identification module is a plurality subscriber information or a plurality identification information to provide communication control module (e.g. communication control module 770). According to an embodiment, the cellular module 821 may perform at least one of the functions of the AP 810. For example, the cellular module 821 may perform at least a part of the multimedia control function.

According to an embodiment, the cellular module 821 may include a Communication Processor (CP). The cellular module 821 may be implemented in the form of SOC. Although the cellular module 821 (e.g. communication processor), the memory 830, and the power management module 895 are depicted as independent components separated from the AP 810, the present disclosure is not limited thereto but may be embodied in a way that the AP includes at least one of the components (e.g. cellular module 821). According to an embodiment, the cellular module 821 includes at least one of a communication control module (e.g. communication control module 116).

According to an embodiment, each of the AP 810 and the cellular module 821 (e.g. communication processor) may load a command or data received from at least one of the components on a non-volatile or volatile memory and process the command or data. The AP 810 or the cellular module 821 may store the data received from other components or generated by at least one of other components in the non-volatile memory.

Each of the cellular module 821, the Wi-Fi module 823, the BT module 825, the GPS module 827, and the NFC module 828 may include a processor for processing the data it transmits/receives. Although the cellular module 821, the Wi-Fi module 823, the BT module 825, the GPS module 827, and the NFC module 828 are depicted as independent blocks. For example, at least two of them (e.g. communication processor corresponding to the cellular module 821 and Wi-Fi processor corresponding to the Wi-Fi module 823) may be integrated in the form of SoC.

The RF module 829 is responsible for data communication, e.g. transmitting/receiving RF signals. Although not depicted, the RF module 829 may include a transceiver, a Power Amp Module (PAM), a frequency filter, and a Low Noise Amplifier (LNA). The RF module 829 also may include the elements for transmitting/receiving electric wave in free space, e.g. conductor or conductive wire. Although FIG. 8 is directed to the case where the cellular module 821, the Wi-Fi module 823, the BT module 825, the GPS module 827, and the NFC module 828 are sharing the RF module 829, the present disclosure is not limited thereto but may be embodied in a way that at least one of the Wi-Fi module 1223, the BT module 1225, the GPS module 1227, and the NFC module 1228 transmits/receives RF signals an independent RF module.

The SIM card 824 may be designed so as to be inserted into a slot formed at a predetermined position of the electronic device. The SIM card 824 may store unique identity information (e.g. Integrated Circuit Card Identifier (ICCID)) or subscriber information (e.g. International Mobile Subscriber Identity (IMSI)).

The memory 830 (e.g. memory 730) may include at least one of the internal memory 832 and an external memory 834. The internal memory 832 may include at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory).

According to an embodiment, the internal memory 832 may be a Solid State Drive (SSD). The external memory 834 may be a flash drive such as Compact Flash (CF), Secure Digital (SD), micro-SD, Mini-SD, extreme Digital (xD), and Memory Stick. The external memory 834 may be connected to the electronic device 801 through various interfaces functionally. According to an embodiment, the electronic device 801 may include a storage device (or storage medium) such as hard drive.

The sensor module 840 may measure physical quantity or check the operation status of the electronic device 801 and convert the measured or checked information to an electric signal. The sensor module 840 may include at least one of gesture sensor 840A, Gyro sensor 840B, atmospheric pressure sensor 840C, magnetic sensor 840D, acceleration sensor 840E, grip sensor 840F, proximity sensor 840G, color sensor 840H (e.g. Red, Green, Blue (RGB) sensor), bio sensor 840I, temperature/humidity sensor 840J, illuminance sensor 840K, and Ultra Violet (UV) sensor 840M. Additionally or alternatively, the sensor module 840 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 840 may further include a control circuit for controlling at least one of the sensors included therein.

The input device 850 may include a touch panel 852, a (digital) pen sensor 854, keys 856, and an ultrasonic input device 858. The touch panel 852 may be one of capacitive, resistive, infrared, microwave type touch panel. The touch panel 852 may include a control circuit. In the case of the capacitive type touch panel, it is possible to detect physical contact or approximation. The touch panel 852 may further include a tactile layer. In this case, the touch panel 852 may provide the user with haptic reaction.

The (digital) pen sensor 854 may be implemented with a sheet with the same or similar way as touch input of the user or a separate recognition sheet. The keys 856 may include physical buttons, optical key, and keypad. The ultrasonic input device 858 is a device capable of checking data by detecting sound wave through a microphone 888 and may be implemented for wireless recognition. According to an embodiment, the electronic device 801 may receive the user input made by means of an external device (e.g. computer or server) connected through the communication module 820.

The display 860 (e.g. display module 750) may include a panel 862, a hologram device 864, and a projector 866. The panel 862 may be a Liquid Crystal Display (LCD) panel or an Active Matrix Organic Light Emitting Diodes (AMO-LED) panel. The panel 862 may be implemented so as to be flexible, transparent, and/or wearable. The panel 862 may be implemented as a module integrated with the touch panel 852. The hologram device 864 may present 3-dimensional image in the air using interference of light. The projector 866 may project an image to a screen. The screen may be placed inside or outside the electronic device 801. According to an embodiment, the display 860 may include a control circuit for controlling the panel 862, the hologram device 864, and the projector 866.

The interface 870 may include a High-Definition Multimedia Interface (HDMI) 872, a Universal Serial Bus (USB) 874, an optical interface 876, and a D0subminiature (D-sub) 878. The interface 870 may include the communication interface 760 as shown in FIG. 7. Additionally or alternatively, the interface 870 may include a Mobile High-definition Link (MHL) interface, a SD/MMC card interface, and infrared Data Association (irDA) standard interface.

The audio module 880 may convert sound to electric signal and vice versa. At least a part of the audio module 880 may be included in the input/output interface 740 as shown in FIG. 7. The audio module 880 may process the audio information input or output through the speaker 882, the receiver 884, the earphone 886, and the microphone 888.

The camera module 891 is a device capable of taking still and motion pictures and, according to an embodiment, includes at least one image sensor (e.g. front and rear sensors), a lens (not shown), and Image Signal Processor (ISP) (not shown), and a flash (e.g. LED or xenon lamp) (not shown).

The power management module 895 may manage the power of the electronic device 801. Although not shown, the power management module 895 may include a Power Management Integrated Circuit (PMIC), a charger Integrated Circuit (IC), a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 896, charging voltage, current, and temperature. The battery 896 may store or generate power and supply the stored or generated power to the electronic device 801. The battery 896 may include a rechargeable battery or a solar battery.

The indicator 897 may display operation status of the electronic device 801 or a part of the electronic device (e.g. AP 810), booting status, messaging status, and charging status. The motor 898 may converts the electronic signal to mechanical vibration. Although not shown, the electronic device 801 may include a processing unit (e.g. GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

According to various embodiments, a computer readable storage medium may store a program that is configured to connect, on the basis of first identification information corresponding to a first entity, an electronic device to an access network operated by the first entity by use of a modem functionally connected with the electronic device, and register, on the basis of second identification information corresponding to a second entity, the electronic device in an IMS network operated by the second entity via the access network.

The apparatuses and methods of the disclosure can be implemented in hardware, and in part as firmware or as machine executable code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor, controller, control unit or other programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" or "microcontroller" constitute hardware in the claimed disclosure that contain circuitry that is configured for operation with software or firmware. Under the broadest reasonable interpretation, the appended claims constitute statutory subject matter in compliance with 35 U.S.C. § 101.

The definition of the terms "unit" or "module" as referred to herein is to be understood as constituting hardware circuitry such as a processor or microprocessor configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and does not constitute software per se or pure software. Nor is the claimed invention an Abstract idea. Each of the components of the electronic device according to the present disclosure may include one or more components or elements. The names of the individual components may be different according to the type of the electronic device. The electronic device according to the present disclosure may include one or more of the components described before, and one or more components may be omitted or other components may be added. One or more components of the electronic device may be combined into an entity having functions identical to those of the combined components.

What is claimed is:

1. An electronic device supporting multiple Internet Protocol (IP) multimedia subsystem (IMS) networks, comprising:
a modem configured to receive communication services through an access network and multiple IMS networks connected with the access network, the multiple IMS networks including at least a first IMS network and a second IMS network;
a plurality of SIM cards including a first SIM card and a second SIM card; and
a processor configured to:
communicatively connect the electronic device to the first IMS network based on the first SIM card, and to the second IMS network based on the second SIM card,
after communicatively connecting the electronic device to the first IMS network and the second IMS network, establish a dummy call creating a bearer to the first IMS network based on the first SIM card through the access network, and
after establishing the dummy call, establish voice communication through LTE communication by the second IMS network through the bearer of the dummy call established via the access network based on the second SIM card,
wherein the first IMS network and the second IMS network provide voice communication through LTE service.

2. The electronic device of claim 1, wherein the processor is configured to obtain at least one portion of address information from the access network, and send a registration request containing the at least one portion of address information to the second IMS network via the access network, and
wherein before the dummy call and the voice communication through LTE communication are established, the electronic device is communicatively connected to the access network based on the first SIM card.

3. The electronic device of claim 1, wherein the processor is configured to obtain address information of the second IMS network from a subscriber identity module functionally connected with the electronic device or connected with an external server, and send a registration request containing the address information to the second IMS network via the access network.

4. The electronic device of claim 1, wherein the processor is configured to send to a second device a first call request based on the second SIM card via the access network and second IMS network, and to send, in response to initiation of the first call request, a second call request based on the first SIM card to at least one external device via the access network and first IMS network, and wherein the first call request is initiated by the electronic device.

5. The electronic device of claim 4, wherein the processor is configured to create a bearer corresponding to a specified service between the electronic device and a specified entity of the access network on the basis of a second call connection.

6. The electronic device of claim 4, wherein the processor is configured to send the second call request containing information on a codec supported by the electronic device.

7. The electronic device of claim 1, wherein the processor is configured to send to a second device a call request based on the second SIM card via the access network and second IMS network, and wherein the call request is initiated by the electronic device and includes the first SIM card.

8. The electronic device of claim 1, wherein the processor is configured to receive a call request from at least one external device via the access network and first IMS network corresponding to the first SIM card, and to send a preset response to the external device, when the call request is a dummy call request for creating a particular bearer corresponding to a specified call service between the electronic device and a specified entity of the access network.

9. The electronic device of claim 8, wherein the processor is configured to determine whether the call request is a dummy call request on a basis of at least one of information on the external device included in the call request and information included in a part of the call request.

10. The electronic device of claim 1, wherein the processor is configured to connect to a gateway of a second access network operated by an entity operating the second IMS network via the access network, obtain additional address information from the gateway of the second access network, and send a registration request to the second IMS network based on the additional address.

11. The electronic device of claim 1, wherein the processor is configured to obtain at least one portion of address information from the access network, and to send to the second IMS network via the access network and first IMS network a registration request including the at least one portion of address information.

12. A method for supporting multiple Internet Protocol (IP) multimedia subsystem IMS networks in an electronic device, the method comprising:
communicatively connecting the electronic device to a first IMS network based on a first SIM card, and to a second IMS network based on a second SIM card;
after communicatively connecting the electronic device to the first IMS network and the second IMS network, establishing a dummy call creating a bearer to a first IMS network based on the first SIM card through an access network; and
after establishing the dummy call, establishing voice communication through LTE communication through the second IMS network through the bearer of the dummy call established via the access network based on the second SIM card,
wherein the first IMS network and the second IMS network provide voice communication through LTE service.

13. The method of claim 12, wherein registering the electronic device in the second IMS network comprises: obtaining at least one address from the access network; and sending a registration request containing the at least one address to the second IMS network via the access network, and
wherein before the dummy call and the voice communication through LTE communication are established, the electronic device is communicatively connected to the access network based on the first SIM card.

14. The method of claim 12, further comprising:
sending to a second device via the access network and second IMS network a first call request based on the second SIM card; and
sending a second call request based on the first SIM card to at least one external device via the access network and first IMS network, in response to initiation of the first call request.

15. The method of claim 14, wherein sending a first call request to a second device comprises sending the second call request containing codec information of the second device.

16. The method of claim 14, further comprising:
receiving a response for the first call request from the second device; and
obtaining codec information of the second device on the basis of information contained in the received response.

17. The method of claim 12, further comprising sending a call request based on the second SIM card to a second device via the access network and second IMS network, and wherein the call request contains the first SIM card.

18. The method of claim 12, further comprising:
receiving a call request corresponding to the first SIM card from at least one external device via the access network and first IMS network; and
sending, when the call request is a dummy call request for creating a particular bearer corresponding to a specified call service between the electronic device and a specified entity of the access network, a preset response to the external device.

19. The method of claim 18, wherein receiving a call request corresponding to the first SIM card comprises:
examining whether the external device is a specified external device or the received call request contains specified information; and
determining that the call request is a dummy call request on the basis of an examination result.

20. An electronic device supporting multiple Internet Protocol (IP) multimedia subsystem (IMS) networks, comprising:
a modem to receive communication services through an access network operated by a first entity and an IMS network connected with the access network operated by a second entity;
a plurality of SIM cards including a first SIM card and a second SIM card; and
a processor configured to:
communicatively connect the electronic device to a first IMS network based on the first SIM card, and to the second IMS network based on a second SIM card,
after communicatively connecting the electronic device to the first IMS network and the second IMS network, establish a dummy call creating a bearer through the access network based on the first SIM card by use of the modem, and
after establishing the dummy call, establish a voice communication through LTE communication by the IMS network through the bearer of the dummy call established via the access network based on the second SIM card,
wherein the IMS network provides voice communication through LTE service.

21. The electronic device of claim 20, wherein the processor is configured to register the electronic device in a second IMS network, operated by the first entity, via the access network on the basis of the first SIM card, send a first call request based on the second SIM card to a second device via the access network and IMS network, and in response to initiation of the first call request, send a second call request based on the first SIM card to at least one external device via the access network and second IMS network, and wherein the first call request is initiated by a user of the electronic device.

22. The electronic device of claim 20, wherein the processor is configured to send to a second device a call request based on the second SIM card via the access network and IMS network, and wherein the call request contains the first SIM card and is initiated by a user of the electronic device.

23. The electronic device of claim 20, wherein the processor is configured to register the electronic device in a second IMS network corresponding to the first SIM card via the access network, receive a call request corresponding to the first SIM card from at least one external device via the access network and second IMS network, and send a preset response to the external device when the call request is a dummy call request for creating a particular bearer corresponding to a specified call service between the electronic device and a specified entity of the access network.

24. The electronic device of claim 23, wherein the processor is configured to determine whether the call request comprises a dummy call request on a basis of at least one of information on the external device contained in the call request and information contained in a part of the call request.

25. A computer readable non-transitory storage medium storing a program executable by a processor to:
- communicatively connect an electronic device to a first IMS network based on a first SIM card, and to a second IMS network based on a second SIM card,
- after communicatively connecting the electronic device to the first IMS network and the second IMS network, establish a dummy call creating a bearer through an access network operated by a first entity by use of a modem functionally connected with the electronic device, based on the first SIM card, and
- after establishing the dummy call, establish voice communication through LTE communication through the bearer of the dummy call established through the access network based on the second SIM card,
- wherein the IMS network provides voice communication through LTE service.

* * * * *

UNITED STATES PATENT AND TRADEMARK OFFICE
CERTIFICATE OF CORRECTION

PATENT NO. : 10,136,453 B2
APPLICATION NO. : 14/598479
DATED : November 20, 2018
INVENTOR(S) : Taesun Yeoum et al.

Page 1 of 1

It is certified that error appears in the above-identified patent and that said Letters Patent is hereby corrected as shown below:

In the Claims

Column 30, Claim 20, Line 24 should read as follows:
--...SIM card, and to a...--
Column 30, Claim 20, Line 25 should read as follows:
--...network based on the second SIM...--

Signed and Sealed this
Eleventh Day of December, 2018

Andrei Iancu
*Director of the United States Patent and Trademark Office*